(12) United States Patent
Dao et al.

(10) Patent No.: US 7,602,818 B2
(45) Date of Patent: Oct. 13, 2009

(54) FIBRE CHANNEL TRANSCEIVER

(75) Inventors: Tuan A. Dao, Seattle, WA (US); Rodney A. Hughes, Tacoma, WA (US); James C. Braatz, Kent, WA (US)

(73) Assignee: The Boeing Company, Chicago, IL (US)

( * ) Notice: Subject to any disclaimer, the term of this patent is extended or adjusted under 35 U.S.C. 154(b) by 1271 days.

(21) Appl. No.: 09/953,057

(22) Filed: Sep. 14, 2001

(65) Prior Publication Data

US 2003/0065859 A1 Apr. 3, 2003

Related U.S. Application Data

(60) Provisional application No. 60/286,918, filed on Apr. 27, 2001, provisional application No. 60/287,121, filed on Apr. 27, 2001.

(51) Int. Cl.
*H04J 3/04* (2006.01)
(52) U.S. Cl. .................... 370/535; 375/375
(58) Field of Classification Search ......... 370/532–545, 370/366; 327/157, 536, 147, 108; 375/373–376, 375/326–327, 219–220; 455/76, 123; 326/62–74; 398/135, 138, 140; 341/68–72, 143
See application file for complete search history.

(56) References Cited

U.S. PATENT DOCUMENTS

| 4,563,775 | A | * | 1/1986 | Yokosuka | 455/126 |
|---|---|---|---|---|---|
| 5,703,511 | A | * | 12/1997 | Okamoto | 327/157 |
| 5,950,115 | A | * | 9/1999 | Momtaz et al. | 455/73 |
| 6,104,326 | A | * | 8/2000 | Lee et al. | 341/68 |
| 6,437,599 | B1 | * | 8/2002 | Groen | 326/63 |
| RE39,405 | E | * | 11/2006 | Edem et al. | 370/446 |
| 2001/0026179 | A1 | * | 10/2001 | Saeki | 327/147 |
| 2001/0030560 | A1 | * | 10/2001 | Neron | 327/157 |
| 2002/0027966 | A1 | * | 3/2002 | Fukuhara | 375/376 |
| 2002/0130801 | A1 | * | 9/2002 | Scott et al. | 341/143 |
| 2002/0135404 | A1 | * | 9/2002 | Payne et al. | 327/108 |

OTHER PUBLICATIONS

Muneo Fukaishi and Kazuyki Nakamura, "A 4.25-Gb/s CMOS Fiber Channel Transceiver with Asynchronous Tree-TYpe Demultiplexer and Frequency Conversion Architecture", IEEE, Dec. 1998.*
PCT International Search Report Application No. PCT/US 02/13414 (filed Apr. 25, 2002), 5 pgs.

(Continued)

*Primary Examiner*—Aung S Moe
*Assistant Examiner*—Habte Mered
(74) *Attorney, Agent, or Firm*—Harness, Dickey & Pierce, P.L.C.

(57) ABSTRACT

A transceiver providing Fiber Channel data transfer speeds may be implemented in a lower performance process technology as a single unit, thereby reducing cost. A serializer and deserializer each having multiple lower frequency clocks are provided to obtain the equivalent of a high speed clock capable of use in Fiber Channel systems. Lower speed parallel data is converted to higher speed serial data, and vice versa. A digital frequency counter along with a phase detection circuit provides synchronization. Comma detection is provided for data word alignment.

19 Claims, 25 Drawing Sheets

OTHER PUBLICATIONS

Fiedler et al., "*A 1.0625 Gbps Transceiver with 2x-Oversampling and Transmit Signal Pre-Emphasis*", 1997 IEEE International Solid State Circuits Conference, Digest of Technical Papers; p. 238-239,464 (1997).

Ewen et al., "*Single-Chip 1062 Mbaud CMOS Transceiver for Serial Data Communication*"; 1995 IEEE International Solid State Circuits Conference, Digest of Technical Papers; p. 32-33, 336 (1995).

Chen et al., "*A 1.25 Gb/s, 460mW CMOS Transceiver for Serial Data Communication*"; 1997 IEEE International Solid State Circuits Conference, Digest of Technical Papers; p. 242-243, 465 (1997).

Gu et al., "*A 0.5-3.5 Gb/s Low-Power Low-Jitter Serial Data CMOS Transceiver*", 1999 IEEE International Solid State Circuits Conference, Digest of Technical Papers; p. 352-353 (1999).

Anonymous, FC106, *Fibre Channel Transceiver 1.0625 GBaud*, (Sep. 1998) ST Datasheets; Retrieved from www.st.com/storline/books/pdf/docs/9.90.pdf on Mar. 12, 2003, p. 1-32.

Anonymous, "*SN75FC1000 1-Gigabit Fibre Channel Transceiver*", (Aug. 1996-May 1998), Texas Instruments Data Sheets; Retrieved from www.s.ti.com/sc/ds/sn75Pc1000.pdf on Mar. 12, 2003; p. 1-18.

* cited by examiner

CLOCK GENERATOR BLOCK DIAGRAM

DELAY LOCKED LOOP BLOCK DIAGRAM

DELAY LOCKED LOOP CLOCKS

FIG. 8 TIME MULTIPLEXER BLOCK DIAGRAM

TIME MULTIPLEXER CLOCKS

FLOW DIAGRAM OF TIME
MULTIPLEXER DATA

DIFFERENTIAL CURRENT SINK BLOCK DIAGRAM

FIG. 15 RECEIVER BLOCK DIAGRAM

FIG. 16  DESERIALIZER BLOCK DIAGRAM

FIG. 19 DESERIALIZER PHASE DETECTION

PHASE DETECTION EXAMPLE

RBC FREQUENCY DETECTION DIAGRAM

DEMULTIPLEXER REGISTER

COMMA DETECTION DIAGRAM

FIBRE CHANNEL TRANSCEIVER

CROSS-REFERENCE TO RELATED APPLICATIONS

This application claims priority from provisional application Ser. No. 60/286,918, filed Apr. 27, 2001, and also from provisional application Ser. No. 60/287,121, filed Apr. 27, 2001.

FIELD OF THE INVENTION

The present invention relates generally to fibre channel systems, and more particularly to a fibre channel transceiver adapted for implementation within CMOS devices.

BACKGROUND OF THE INVENTION

As computer processor speeds continue to increase, the need for reliable high data transfer rates between interconnected devices becomes more critical. This includes communication between networked devices, as well as between a specific device and its peripheral components (i.e., I/O connections).

Systems and interfaces were developed to provide faster data transfer between devices to meet the increased demand for speed. However, the development of different systems resulted in many different standards, protocols and requirements. Thus, compatibility became a problem.

In the 1980's, the Small Computer Systems Interface (SCSI) standard was developed to provide faster data transfer between devices. The original SCSI interface (i.e., SCSI-1) provided a high-speed (e.g., 5 MB/sec) parallel interface for connecting numerous devices. Subsequently, improved SCSI interfaces were developed providing data transfer rates up to 80 MB/sec. SCSI technology was implemented in many devices, including many peripheral components, such as, for example, disk drives, CD-ROM drives, scanners and printers. However, SCSI does not always meet the rapidly increasing data transfer demands of many of present computer systems. Further, SCSI interfaces have very limited bus lengths. Thus, for example, for systems requiring interconnection of devices in separate buildings, a SCSI interface is not capable of providing communication. Further, expensive connectors or cables may be required.

A higher bandwidth protocol independent system was needed to meet the demands of the increasing performance in computers, processors and peripheral devices. In response to the increased demands, Fibre Channel technology was developed and provides high speed, scalable communication between computer devices, particularly in systems requiring the transfer of large amounts of data and/or requiring transfer of data over a substantial distance. Fibre Channel technology provides a high bandwidth flexible interface and serial data transfer architecture that meets the demands of the high-speed data transfer requirements of present computer systems. This technology supports data transfer over longer distances and supports multiple data rates, media types and connection types.

As a result of the high-speed transfer capabilities of Fibre Channel technology, interconnection devices for systems using this technology must also support these high speeds. For example, a switch, router or hub for controlling data transfer in a Fibre Channel system must have the capability to support bandwidth rates of over one gigahertz (Ghz). Further, the transmitter at one port of the system and the receiver at another port of the system must support this high speed data transfer.

The problem with the communicating devices (i.e., transmitter and receiver) in a Fibre Channel system is that the speed requirements limit the types of material that can be used to support the high bandwidth. With respect specifically to transmitting and receiving data within a Fibre Channel system, most transmitters, receivers and/or transceivers ("communication devices") are implemented using higher performance process technologies, such as Gallium Arsenide, which are particularly useful for high-speed electronic switching applications. Additionally, these communication devices are normally monolithic implementations. Thus, present Fibre Channel communication devices capable of operating at speeds of greater than one gigabits per second (Gbps) are typically implemented as discrete Integrated Circuits (ICs) in process technologies capable of supporting GHz frequencies (e.g., Gallium Arsenide).

For example, IC Fibre Channel transceivers are used to translate high speed Fibre Channel serial data to low speed Fibre Channel parallel data for protocol processing. Further, low speed Fibre Channel parallel data from a protocol processor is translated into high speed Fibre Channel serial data for transmission along the physical medium (e.g., fiber optic cable). Because most Fibre Channel protocol processor Application Specific ICs (ASICs) are highly complex digital devices, they are typically implemented in CMOS technologies for low power, high yield and low cost. Thus, present Fibre Channel transceivers are not adapted for integration into Fibre Channel protocol processor ASICs. These devices must be manufactured separately, thereby resulting in multiple packaging of the devices, with an increase in cost.

Thus, in order to reduce complexity and cost, it is desirable to provide a Fibre Channel transceiver as a core module adapted for integration into lower performance process technology devices, such as a Fibre Channel protocol processor ASIC.

SUMMARY OF THE INVENTION

The present invention provides a Fibre Channel transceiver and method of providing the same adapted for implementation in CMOS technology and capable of high speed operation (e.g., GHz operation). The transceiver achieves high integration levels, high operating frequencies, low power and low jitter, and may be provided as a core module for integration into a Fibre Channel protocol controller ASIC or other lower performance process technology devices (i.e., CMOS devices). Thus, the transceiver provides for the integration of Fibre Channel transmit/receive functionality with Fibre Channel protocol functionality.

A transceiver of the present invention is generally comprised of two separate components or units: (1) a receiver and (2) a transmitter. In one preferred embodiment, the receiver accepts serial Fiber Channel data at 1.0625 Gbps and translates the data into ten-bit 106.25 Mega Bits Per Second (Mbps) parallel data. The transmitter preferably accepts twenty-bit parallel data at 53 Mbps and translates the data into 1.0625 Gbps serial data. Depending upon the system requirements, the transmit and receive speeds, as well as the data word size, may be modified.

The Fibre Channel transceiver is designed as a core analog/mix-signal module adapted for implementation into, for example, a digital Fiber Channel protocol ASIC. As a result of the integration capability, cost is decreased and performance is increased compared to monolithic Fibre Channel transceiver implementations.

Specifically, a Fibre Channel transceiver of the present invention includes a transmitter that accepts two parallel ten-bit characters (i.e., two data words each having two five-bit data sections) that are serialized using a serializer. The serialized data is transmitted on differential current sink outputs at a bit rate twenty times greater than that of the parallel data streams. An analog delay locked loop (ADLL) component provides ten parallel phase shifted clocks for use in controlling the data bits being transmitted. A phase detector is provided that preferably uses a current step case to monitor phase crossings. The phase detector is preferably implemented as a wired "AND" detector configured in a totem pole design. A time multiplexer is preferably provided to convert the twenty-bit data to two ten-bit wide data sections, which are then each further converted to two five-bit wide data sections to be transmitted as serial data. Further, the differential current sink output provides a positive ECL translation. An output pre-emphasis circuit is provided that reduces jitter.

A receiver of the Fibre Channel transceiver of the present invention receives a serial data stream and coverts the data into a ten-bit parallel data stream at $1/10^{th}$ the input data rate. An analog input multiplexer provides external control to select from one of three different data sources. The output of the multiplexer is converted to parallel data by a deserializer. The deserializer includes a plurality of receive amplifiers, a voltage controlled ring oscillator (VCRO), phase detectors and an integration capacitor. The receive amplifiers sample the serial data with the VCRO adjusting the phase relationship of its output clocks such that data samples are taken in the middle of each data bit. Preferably, a data sample is also taken at the transition boundaries between data bits. The VCRO is tuned with an internal integration capacitor that sets a pole frequency of a loop filter. A frequency detector monitors the clocking of the VCRO and is compared against a reference source. Preferably, frequency detection is provided using digital counters.

Thus, a Fibre Channel transceiver of the present invention is adapted for integration into, for example, a CMOS device, such as a Fibre Channel protocol processor ASIC. Fibre Channel data transfer speeds are obtained in a lower performance process technology. Further, not only is adaptability increased, but cost reduced by fabricating the transceiver and protocol ASIC in a single package.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. Thus, although the application of the present invention as disclosed herein is generally directed to a transceiver having specific component parts adapted for integration into a Fibre Channel protocol processor ASIC, and providing data segments at specific data rates, it is not so limited, and may be implemented in combination with other CMOS devices for use in a Fibre Channel system that may have different data size and transfer rate requirements.

Figure 1:
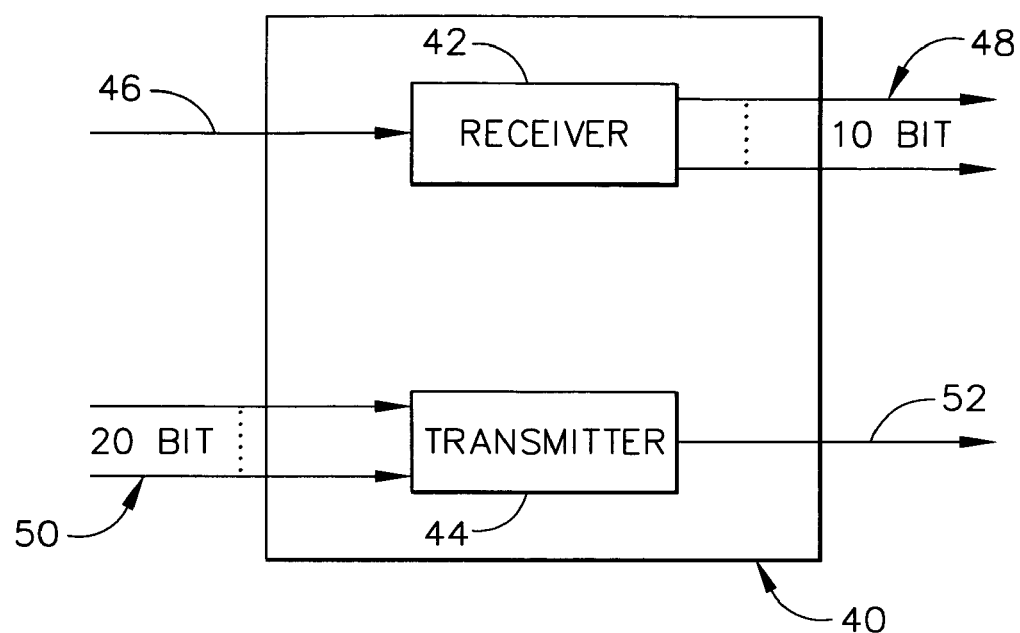
FIG. 1 is a simplified block diagram of a transceiver constructed according to the principles of the present invention.

Referring to FIG. 1, a transceiver constructed according to the principles of the present invention is shown generally therein and indicated by reference numeral 40. As shown therein, the transceiver 40 generally comprises a receiver 42 and a transmitter 44. The receiver 42 translates or coverts a single high-speed Fibre Channel serial data stream 46 to a slower speed parallel data stream 48. For example, a 1.0625 Gbps single serial data stream is converted by the receiver 42 to a ten-bit 106.25 Mbps parallel data stream 48. The transmitter 44 receives a slower speed parallel data stream 50 (e.g., twenty-bit parallel data), which may comprise, for example, two ten-bit parallel data streams, and translates or converts the data stream to a single high-speed Fibre Channel serial data stream 52. For example, a twenty-bit 53 Mbps parallel data stream 50 is converted by the transmitter 44 to a 1.0625 Gbps single serial data stream 52.

Figure 2:
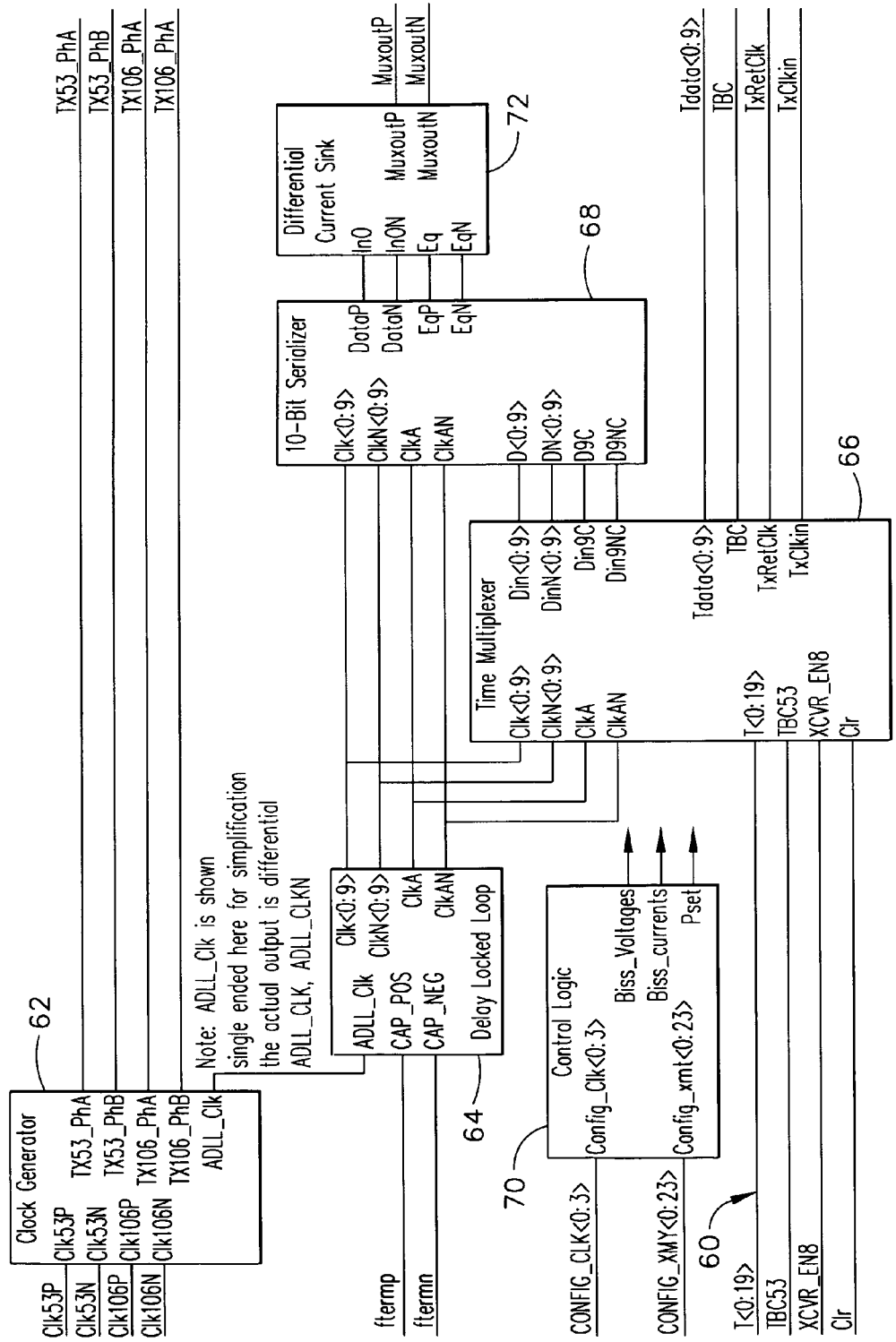
FIG. 2 is a schematic block diagram of a transmitter of the present invention.

With respect to the transmitter 44, a twenty-bit wide data word is received and translated it into a single high-speed serial data stream 52 at preferably twenty times the input rate. In a particularly preferred embodiment, as shown in FIG. 2, the transmitter 44 accepts two parallel ten-bit characters on a T(0:19) bus 60, which are latched on the falling edge of the Transmit Byte Clock (TBC53) as described herein. This data is then serialized and transmitted on the Differential Current Sink Outputs (MuxoutP and MuxoutN) at a bit rate of twenty times the frequency of the TBC input. It should be noted that bit T(0) is preferably transmitted first.

A Clock Generator block 62 accepts differential clock inputs of 53.125 MHz (Clk53P and Clk53N) and 106.25 MHz (Clk106P and Clk106N). These inputs are sampled to produce a symmetrical (i.e., 50% duty cycle) 53.125 MHz clock provided as ADLL_CLK.

An Analog Delay Locked Loop (ADLL) block 64 produces ten clocks (Clk<0:9>), and in conjunction with their complements (Ckn<0:9>), produce twenty rising edge transitions during one period of the 53.125 MHz ADLL_CLK. Each transition is sequentially delayed by ½₀th of the 53.125 MHz period (i.e., 941 pS). These clocks are logically combined to produce control signals for a Time Multiplexer block 66 and a ten-bit Serializer block 68 to simultaneously convert the loaded parallel data into a serial bit stream, while loading the next parallel data to be serialized.

A Control Logic block 70 receives external digital commands and provides programmed bias voltages (Bias_Voltages) and programmed bias currents (Bias_currents) to the other blocks. A reset (Rset) signal is also provided to clear all the digital registers.

A Differential Current Sink block 72 drives the serialized data off-chip. Preferably, the Differential Current Sink block 72 contains a "pre-emphasis" circuit to reduce the jitter of the output data. The pre-emphasis circuit increases the output current drive only for logic transitions.

Figure 3:
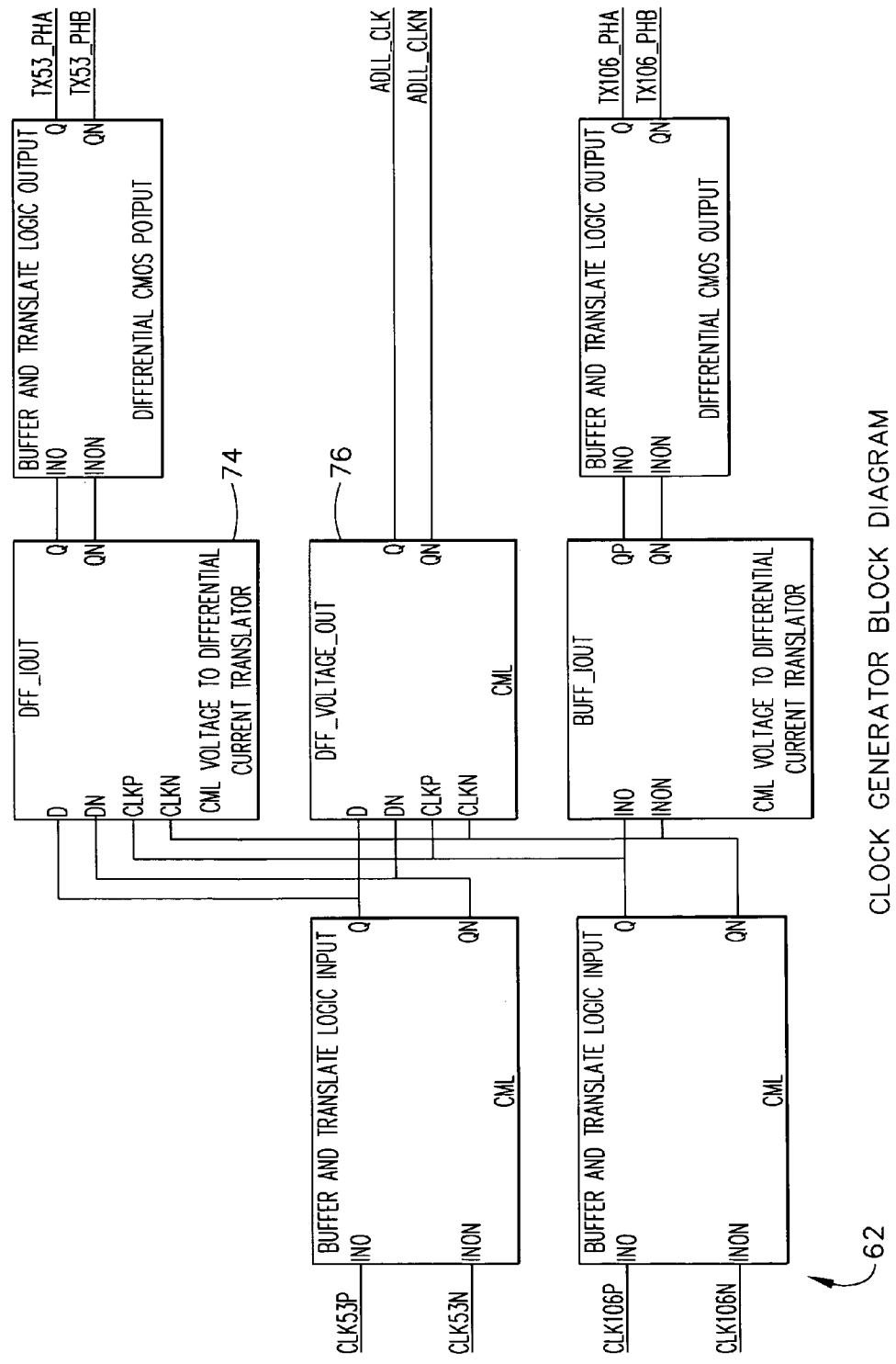
FIG. 3 is a schematic block diagram of a clock generator of the transmitter of the present invention.
Figure 4:
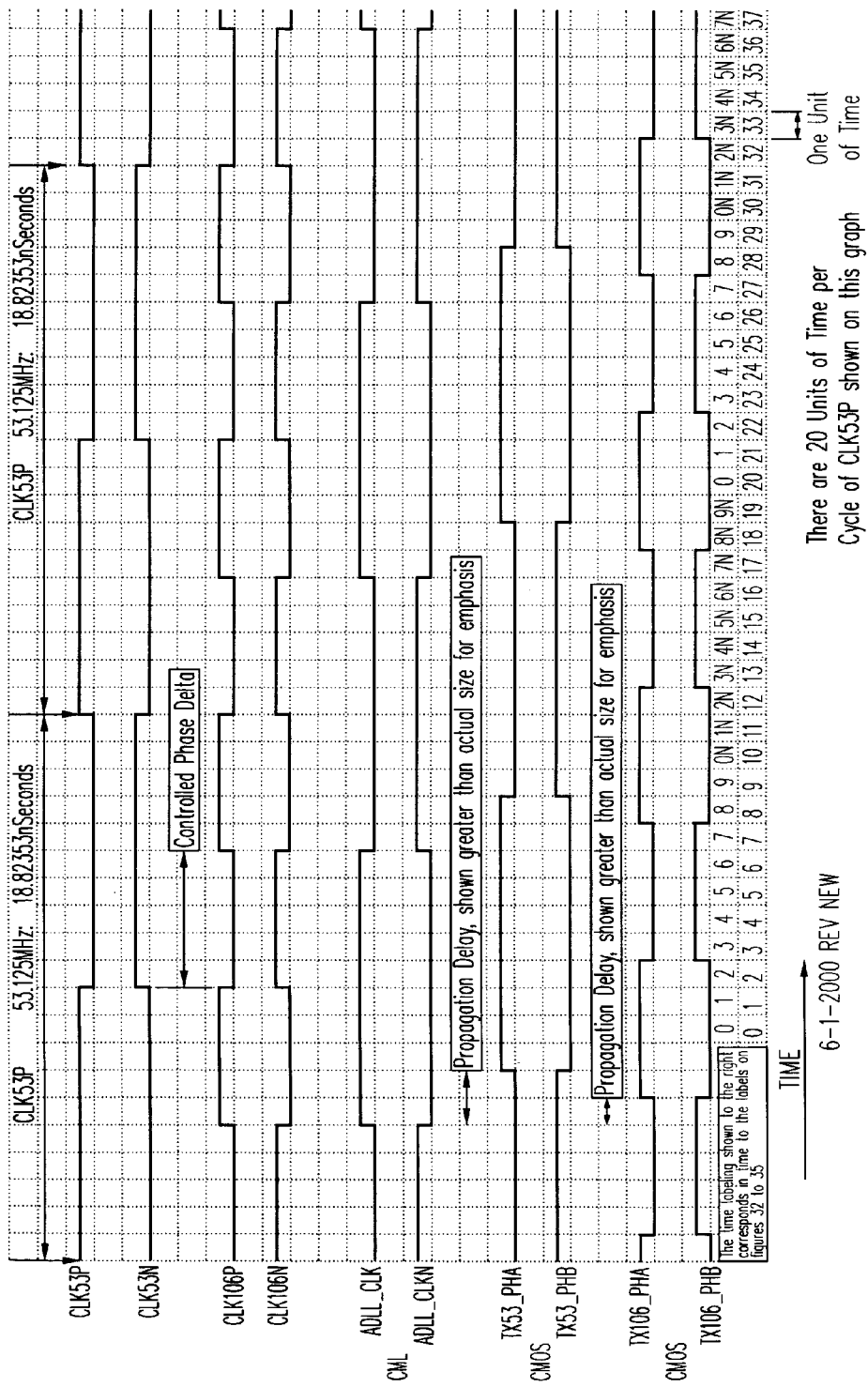
FIG. 4 is a timing diagram for the clock generator of FIG. 3.

Specifically, and as shown in FIG. 3, the Clock Generator block 62 receives the two pairs of differential input clocks: CLK53P, CLK53N (53.125 MHz), and CLK106P, CLK106N (106.25 MHz). A timing diagram for the Clock Generator block 62 is shown in FIG. 4. The ADLL_CLK differential outputs are used by the ADLL block 64 to generate ten equally phased clocks and their complements. The implementation of the ADLL block 64 is such that deviation from a 50% duty cycle on the input ADLL_CLK will cause the phased clocks to have the wrong relationship to one another, which may result in the serialized output data having bit times of varying widths. Thus, the Clock Generator block 62 maintains the ADLL_CLK at a 50% duty cycle.

The generation of a controlled 50% duty cycle signal for the ADLL_CLK and TX_53 clocks is provided by sampling the state of the CLK53P/CLK53N clocks using two high speed Current Mode Logic (CML) D-type Flip-Flops 74, 76. This sampling is performed on the rising edge of the CLK106P clock as shown in FIG. 4. The controlled phase relationship between the CLK106 and CLK53 clocks ensures that each sample will be a change of state, and that it will be the same change of state for other clock generator circuits using the same method in the system. To the extent that the period of the CLK106 clock is held precisely constant, the length of time the output is in the high state will be the same as the length of time the output is in the low state. This length of time is one period of the TX106 clock.

In addition to providing the ADLL_CLK and ADLL_CLKN differential clocks for use by the ADLL block 64, the Clock Generator block 62 also provides the TX53_PHA, TX53_PHB, TX106_PHA, and TX106_PHB differential clocks for use as off-chip references such as, for example, for use with external monitor pins (i.e., test pins), etc.

Figure 5:
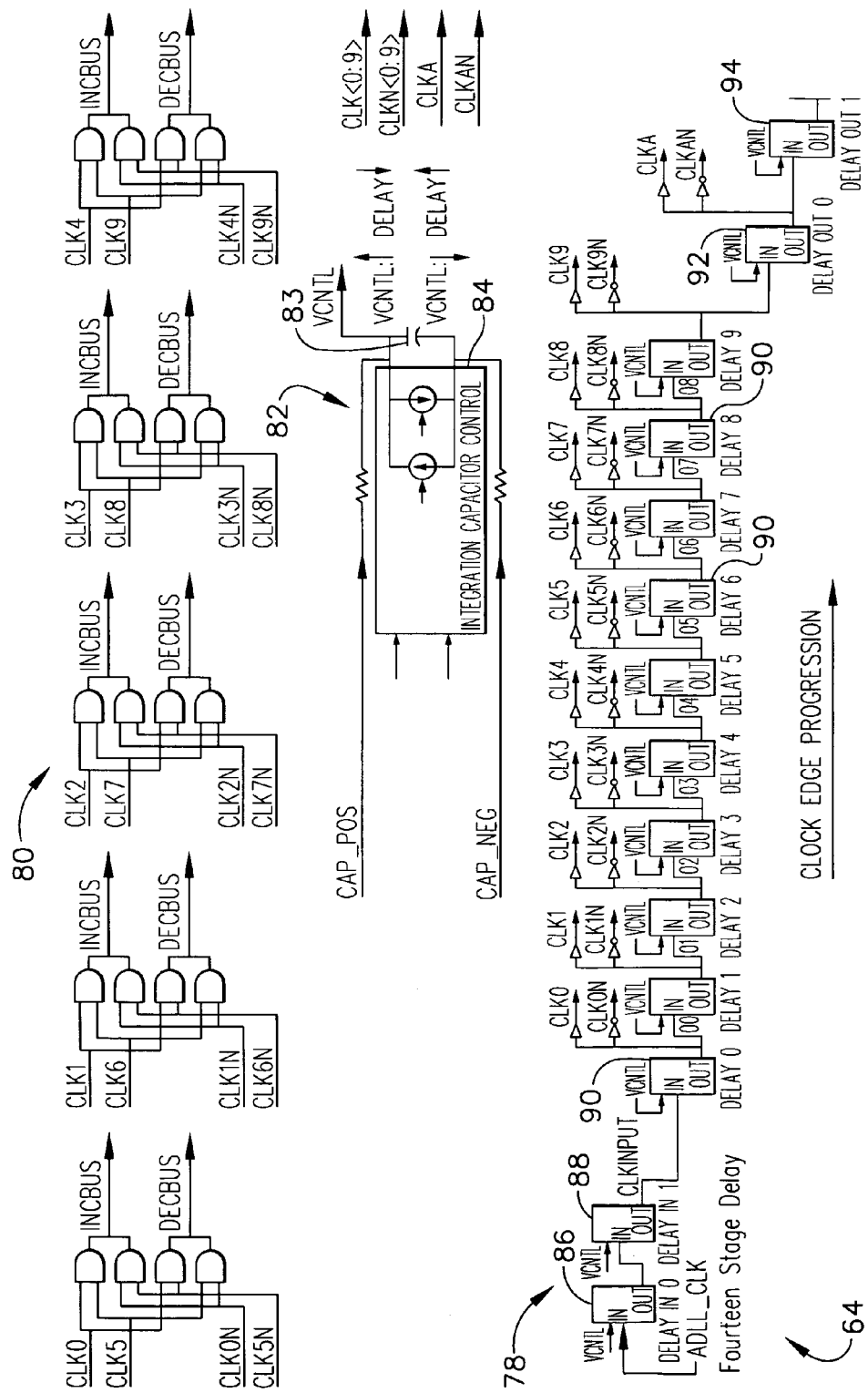
FIG. 5 is a schematic block diagram of a delay locked loop of the transmitter of the present invention.
Figure 6:
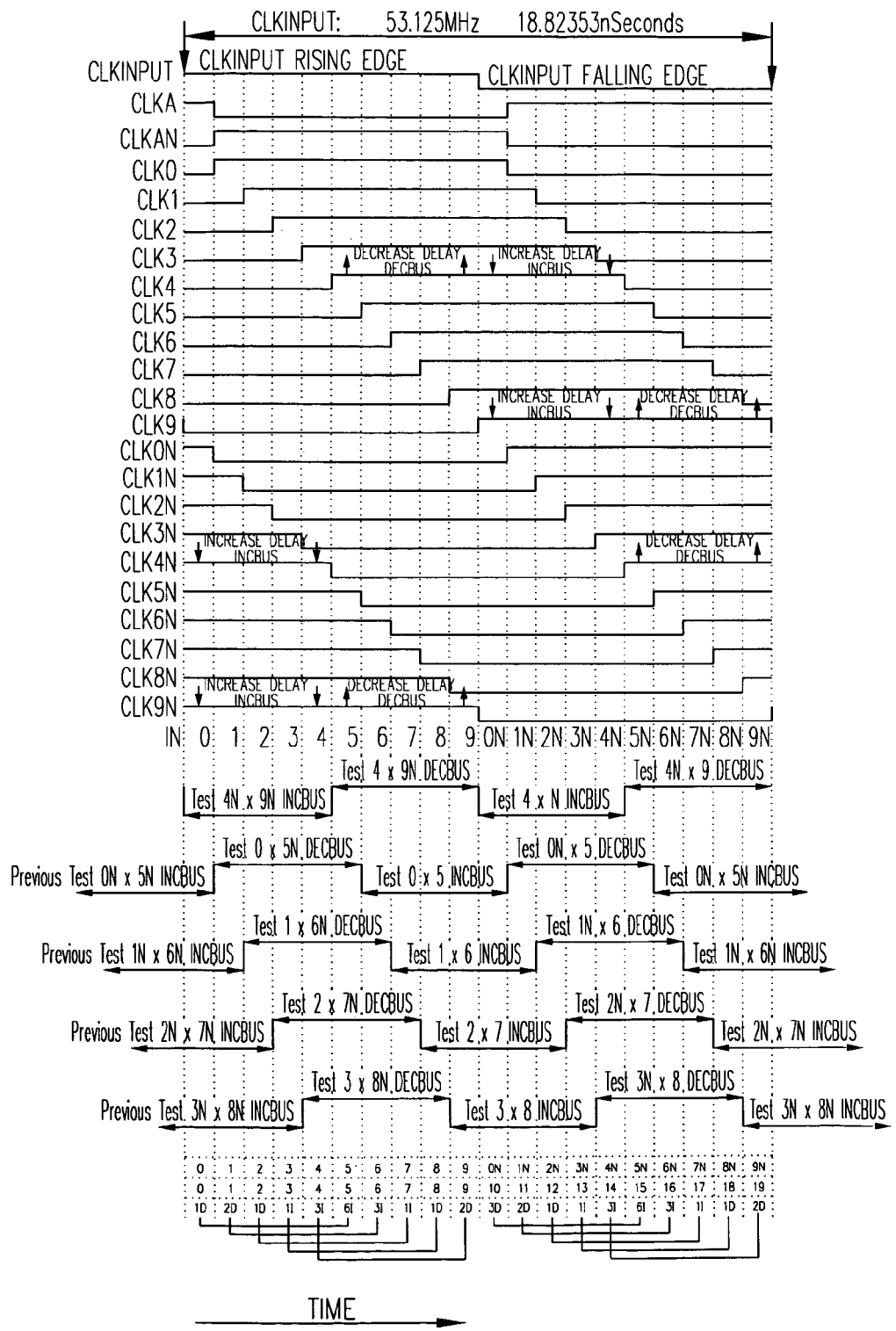
FIG. 6 is a timing diagram of delay locked loop clocks for the delay locked loop of FIG. 5.

Referring to FIG. 5, the ADLL block 64 receives a differential input clock, ADLL_CLK, at 53.125 MHz, and outputs ten parallel clocks and their complements. These twenty output clocks have the same frequency as the input ADLL_CLK. In accordance with a more preferred embodiment, each of these clocks are separated in phase from each other by eighteen degrees (i.e., 941 pS). These twenty clocks taken together provide new clock outputs at a rate twenty times the input frequency (i.e., 1.0625 GHz). The timing of the output clocks of the ADLL block 64 is shown in FIG. 6. Providing the equivalent of a 1.0625 GHz clock by utilizing twenty equally phased 53.125 MHz clocks allows for implementations in slower CMOS IC processes, as well as simplifying clock distribution to all the registers.

The ADLL block 64 generally consists of the following components: Voltage Controlled Delay Circuit 78, phase detector INCBUS/DECBUS logic (DLPD1) 80, and charge pumps/integration capacitor circuit 82. The INCBUS/DECBUS logic forces the delay controlled by VCNTL to be such that a clock will remain in the same state for 5 delay periods and then transition to the opposite state for 5 delay periods. The five INCBUS and DECBUS outputs are added together at the integration capacitor control 84 providing 1 to 5 units of DECBUS or INCBUS command. The charge pumps are implemented in an integration capacitor control block 84 that provides current pulses to an integration capacitor 83. The CAP_POS and CAP_NEG pins allow an external filter network to be added to the integration capacitor circuit 82. The output voltage of the integration capacitor 83 (VCNTL) controls the delay of the Voltage Controlled Delay Circuit 78.

The input ADLL_CLK is differential and delay elements 90 are differential. The twenty outputs are taken from the ten delay elements 90 (i.e., DELAY-0 through DELAY-9). The DELAY-IN-0 and the DELAY-IN-1 cells 86, 88 on the input ensure that the source impedance into the DELAY-0 cell is the same as that throughout the delay string. The DELAY-OUT-0 and the DELAY-OUT-1 cells 92, 94 ensure that the loading of the DELAY-9 cell is the same as the loading from the DELAY-0 through DELAY-9 string. The CLKINPUT signal is the output from the DELAY_IN__1 cell.

Referring again to FIG. 6, and the timing of the delay locked loop clocks, shown therein is the relationship of the twenty output clocks to the CLKINPUT clock. The CLKINPUT signal is the ADLL_CLK delayed by the first two delay elements 90. A steady state condition is shown wherein the target value for the delay of all of the delay elements 90 of the Voltage Controlled Delay Circuit 78 are exactly ½₀th the period of ADLL_CLK. Two additional output clocks are also provided: CLKA, and CLKAN. Under steady state conditions, these clocks will be the same as the CLK0N and CLK0 outputs, respectively.

With respect to the phase detector 80 of the transmitter 44 as shown in FIG. 5, a current step case as described herein is provided to identify phase crossings. The twenty clock edges associated with the ten ADLL 64 clock outputs are logically "ANDed" as follows:

$$\begin{aligned}
I(\mathit{InInc}\ \mathrm{Bus}) = &(CLK<0>\ \&\ CLK<5>) + (CLKN<0>\ \&\ CLKN<5>) + \\
&(CLK<1>\ \&\ CLK<6>) + (CLKN<1>\ \&\ CLKN<6>) + \\
&(CLK<2>\ \&\ CLK<7>) + (CLKN<2>\ \&\ CLKN<7>) + \\
&(CLK<3>\ \&\ CLK<8>) + (CLKN<3>\ \&\ CLKN<8>) + \\
&(CLK<4>\ \&\ CLK<9>) + (CLKN<4>\ \&\ CLKN<9>)
\end{aligned}$$

$$\begin{aligned}
I(\mathit{InDec}\ \mathrm{Bus}) = &(CLK<0>\ \&\ CLK<5>) + (CLKN<0>\ \&\ CLKN<5>) + \\
&(CLK<1>\ \&\ CLK<6>) + (CLKN<1>\ \&\ CLKN<6>) + \\
&(CLK<2>\ \&\ CLK<7>) + (CLKN<2>\ \&\ CLKN<7>) + \\
&(CLK<3>\ \&\ CLK<8>) + (CLKN<3>\ \&\ CLKN<8>) + \\
&(CLK<4>\ \&\ CLK<9>) + (CLKN<4>\ \&\ CLKN<9>)
\end{aligned}$$

Essentially, the logic of the InInc Bus consists of five exclusive NOR (XNOR) gates. For each XNOR gate whose inputs are the same, a current path to ground is provided. The current flowing through this path is approximately equal to IbiasN (nominally 160 uA). If none of the XNOR gates have equivalent inputs, the voltage of the InInc Bus will be pulled up to VDD. For each XNOR gate that has equivalent input data, one IbiasN current will be drawn from the INCBUS Port of the charge pump. The INCBUS current can vary between 0 (no XNOR gate outputs providing a path to ground) to five times IbiasN (all five XNOR Gates provide a path to ground). In operation, as more current is drawn out of the INCBUS port, the INCBUS voltage is lowered resulting in the increase of the discharging current from the INCBUS charge pump output.

The logic of the InDec Bus consists essentially of five exclusive OR (XOR) gates. For each XOR gate whose inputs are different, a current path to ground is provided. The current through this path is approximately equal to IbiasN (Nominally 160 uA). If none of the XOR gates have dissimilar inputs, the voltage of the InDec Bus will be pulled up to VDD. For each XOR gate that has dissimilar input data, one IbiasN current will be drawn from the DECBUS Port of the charge pump. The DECBUS current can vary between 0 (no XOR gate outputs provide a path to ground) to five times IbiasN (all five XOR gates provide a path to ground). In operation, as more current is drawn out of the DECBUS port, the DECBUS voltage is lowered resulting in the increase of the discharging current from the DECBUS charge pump output.

Figure 7:
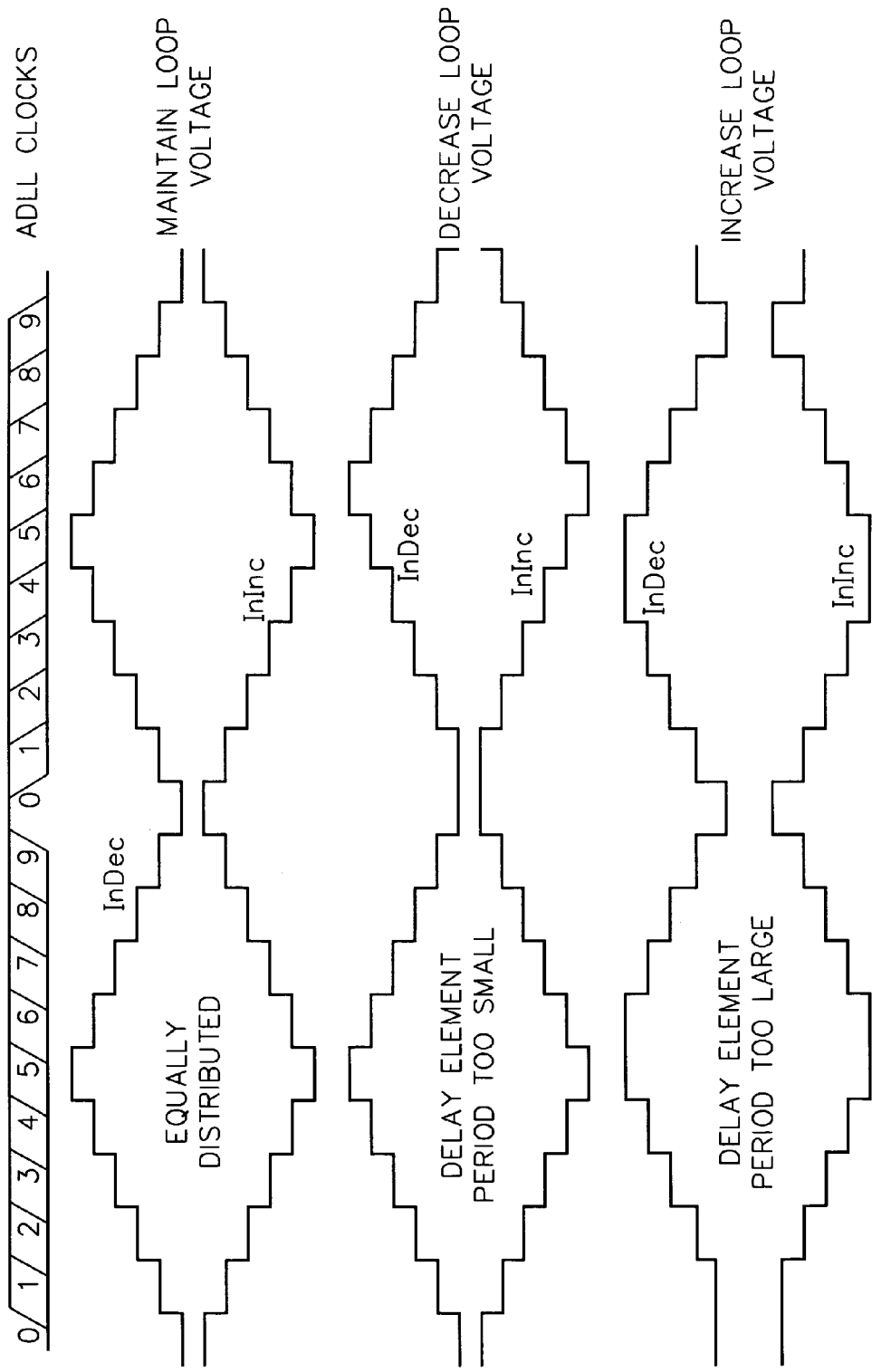
FIG. 7 is a timing and voltage diagram for the phase detectors and ADLL control Loop.

Referring now to FIG. 7, the topmost trace shows the twenty clock edges (i.e., ten differential clock outputs) of the ADLL block 64. The CLK<0> output is the first clock transition output from the ADLL block 64, the CLK<1> output is the second clock transition output from the ADLL block 64, and so forth. Thus, the CLK<9> output is the last clock transition output from the ADLL block 64, when viewed in sequential order.

As shown in FIG. 7, the traces labeled "Maintain Loop Voltage" show the typical "staircase" current waveforms that would appear on the InInc and InDec Buses if the ADLL block 64 was locked. The phase error shown is zero. Because the half-period of the intermediate clock signals are equally divided among the ten delay elements 90, five distinct current steps up and down having opposite slopes are provided on both the InInc and InDec buses. This results in an average error current of zero and no net discharging or charging of the loop filter integration capacitor 83. The integration capacitor 83 will be continuously charged and discharged by the same amount of current.

The traces labeled "Decrease Loop Voltage" show the typical "staircase" waveforms that would appear on the InInc and InDec Buses if the ADLL block 64 was not locked. The phase error shown in this case is positive. In this condition, the half-period of the intermediate frequency signal is not equally divided among the ten delay elements 90. Furthermore, the delay through the individual delay elements 90 is less than one-tenth of the half-period of the intermediate frequency signal. As a result, the average magnitude of the current on the InInc Bus will be greater than the average magnitude of the current on the InDec Bus. Consequently, the charge pump currents will effectively be discharging the loop integration capacitor 83. A net discharging of the loop integration capacitor 83 results in a decrease in the control voltage (VCNTL) of the Delay Circuit 78. This decrease in the control voltage increases the delay through the delay elements 90, thus slowing down the ADLL block 64.

The traces labeled "Increase Loop Voltage" show the typical "staircase" waveforms that would appear on the InInc and InDec Buses if the ADLL block 64 was again not locked. The phase error shown in this case is negative. In this condition, the half-period of the intermediate frequency signal is not equally divided among the ten delay elements 90. Furthermore, the delay through the individual delay elements 90 is greater than one-tenth of the half-period of the intermediate frequency signal. As a result, the average magnitude of the current on the InDec Bus will be greater than the average magnitude of the current on the InInc Bus. Consequently, the charge pump currents will effectively be charging the loop integration capacitor 83. A net charging of the loop integration capacitor 83 results in an increase of the control voltage (VCNTL) of the Voltage Controlled Delay Circuit 78. This increase in the control voltage will decrease the delay through the delay elements 90, thus speeding up the ADLL block 64.

Figure 8:
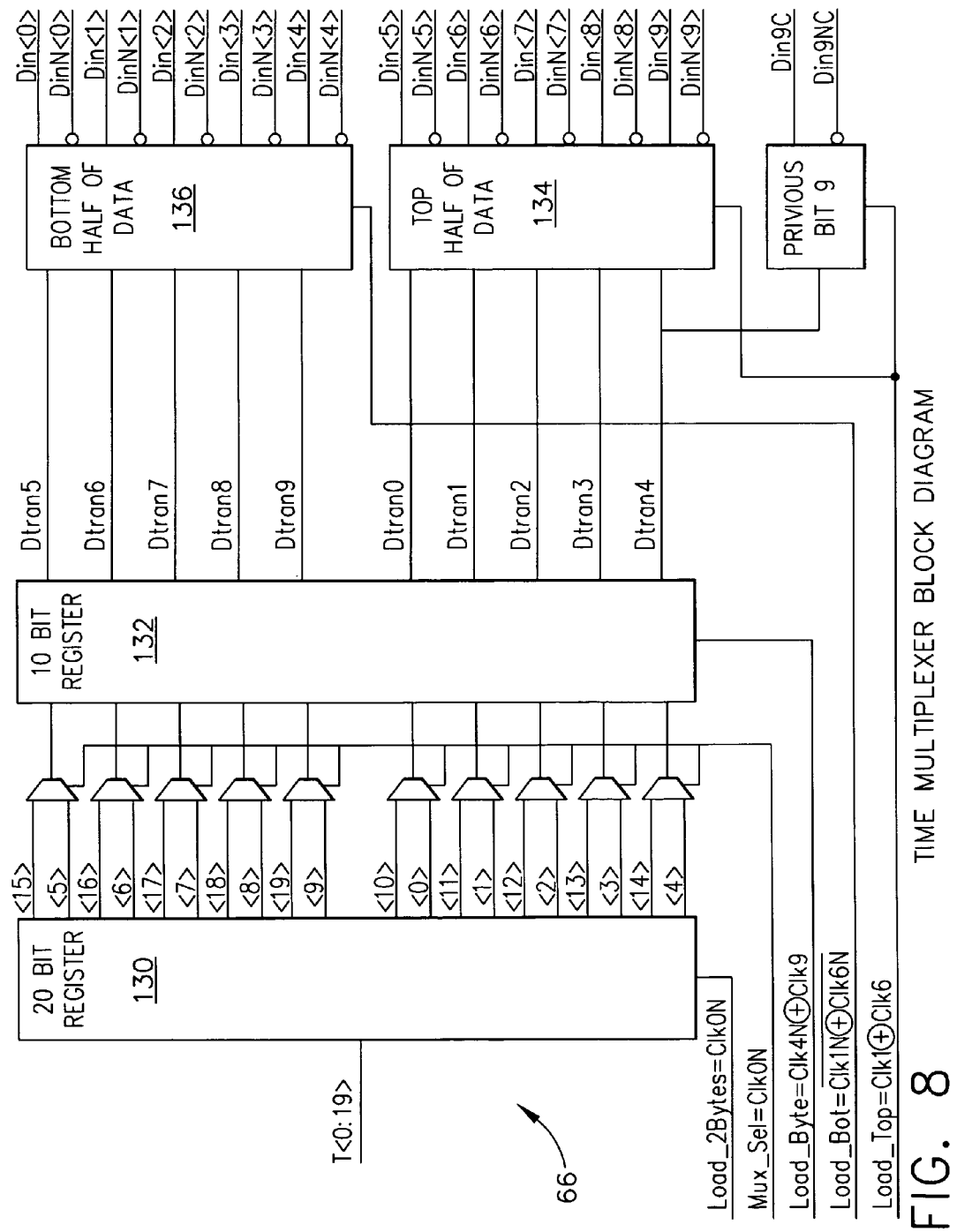
FIG. 8 is a simplified schematic block diagram of a time multiplexer of the transmitter of the present invention.

As shown in FIG. 8 the Time Multiplexer block 66 receives twenty-bit parallel data on T<0:19> and clock inputs from the ADLL block 64. The Time Multiplexer block 66 converts the twenty-bit data to two ten-bit wide data sections. Each ten-bit data section is then converted to two five-bit wide data sections to be processed by the ten-bit Serializer block 68 as described herein, and which produces the final serial output 52. The partitioning of data into smaller sections is preferably provided to enable portions of the data to be loaded while simultaneously outputting the previously loaded data. The control signals generated from the ten clocks provided by the ADLL block 64 are shown in FIG. 9

Figure 9:
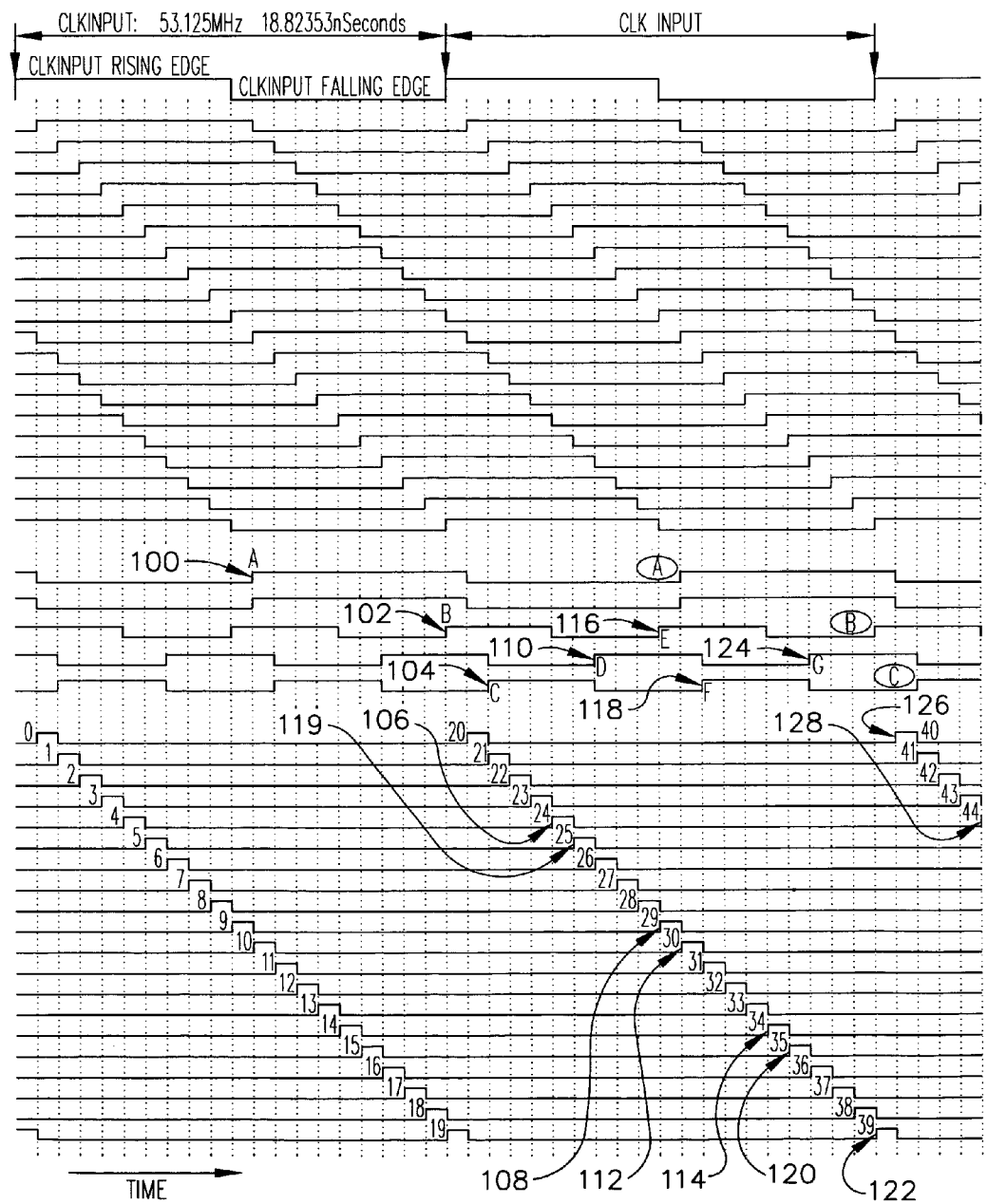
FIG. 9 is a timing diagram of the clocks for the time multiplexer of FIG. 8.

In operation, and referring specifically to FIGS. 8 and 9, at time 100, the Load_2 Bytes signal initiates loading of the twenty bits of data contained in T<0:19> into a twenty-bit register 130. At time 102, the lower ten bits of data T<0:9> are caused to be loaded into a ten-bit register 132 by the Load_Byte signal. At time 104 the lower five bits from the ten-bit register 132 are caused to be loaded into a top half of data register 134 by the signal Load_Top. Beginning at time 106 and ending at time 108, each bit is sequentially serialized by the ten-bit Serializer block 68. T<0> is the first bit output from the serializer 68 followed by T<1>, T<2> . . . T<19>, in sequence. It should be noted that T<0> is output during the time period the waveform labeled Din<5>/T<0> is high.

At time 110 the upper five bytes from the ten-bit register 132 are caused to be loaded into a bottom half of data register 136 by the signal Load_Bot. Beginning at time 112 and ending at time 114, each bit is sequentially serialized by the ten-bit Serializer block 68.

At time 116, the upper ten bits of data T<10:19> are caused to be loaded into the ten-bit register 132 by the Load_Byte signal. Note that Mux_Sel is low at this time. At time 118 the lower five bits from the ten-bit register 132 are loaded into the top half of data register 134 which is caused by the signal Load_Top. Beginning at time 120 and ending at time 122, each bit is sequentially serialized by the ten-bit Serializer block 68.

At time 124 the upper five bits from the ten-bit register 132 are loaded into the bottom half of data register 136 which is caused by the signal Load_Bot. Beginning at time 126 and ending at time 128, each bit is sequentially serialized by the ten-bit Serializer block 68.

Figure 10:
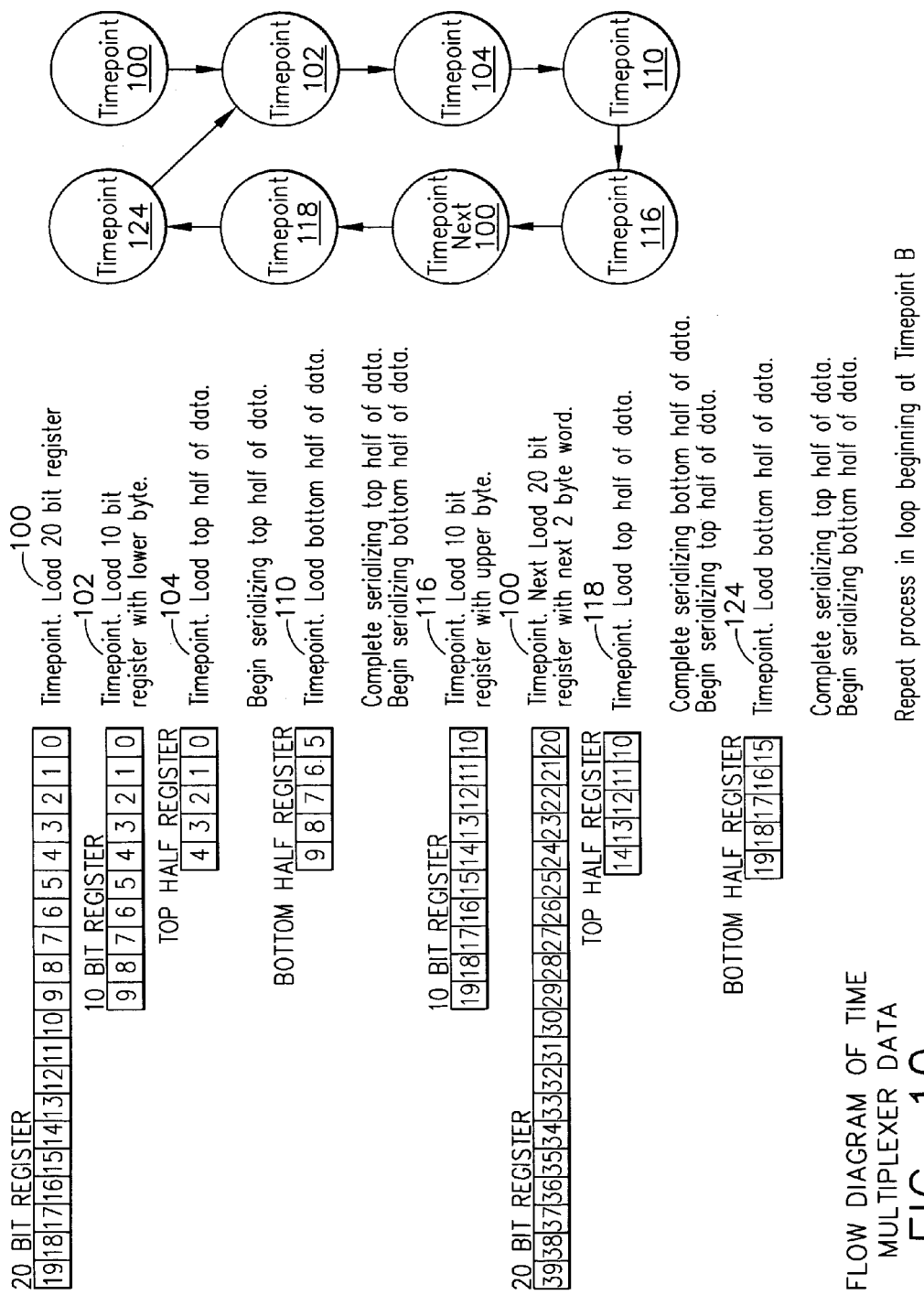
FIG. 10 is a simplified flow diagram of the data flow of the time multiplexer of FIG. 8.

For example, FIG. 10 illustrates the twenty-bit register 130 loaded at time 100 and shows how the loaded data is propagated to the outputs as time progresses. The time referenced therein corresponds to the timing in FIG. 9.

Figure 11:
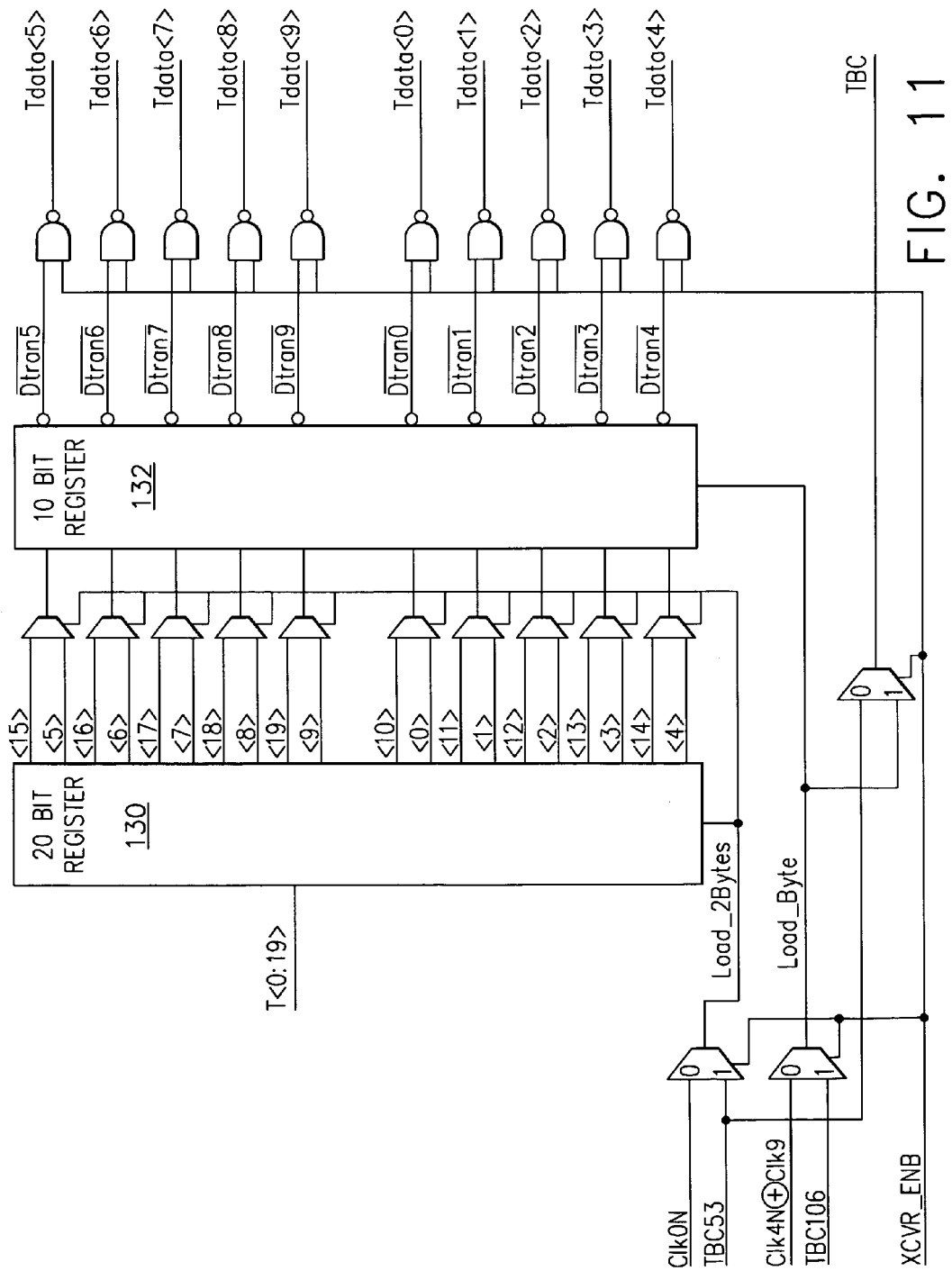
FIG. 11 is a detailed schematic block diagram of the time multiplexer of FIG. 8.

Referring now to FIG. 11, and the Time Multiplexer block 66 shown therein in more detail, the transmitter 44 may be disabled in the event a different external transmitter is used. Disabling of the transmitter 44 is controlled by the XCVR_ENB signal. It should be noted that a logic 1 on this signal disables the transmitter 44. When XCVR_ENB is set to one, TBC53 is the clock selected to load two bytes of data into the twenty-bit register 130. TBC106 is the clock used to latch single bytes onto Tdata<0:9> with T<0:9> first, followed by T<10:19>, and so on.

Figure 12:
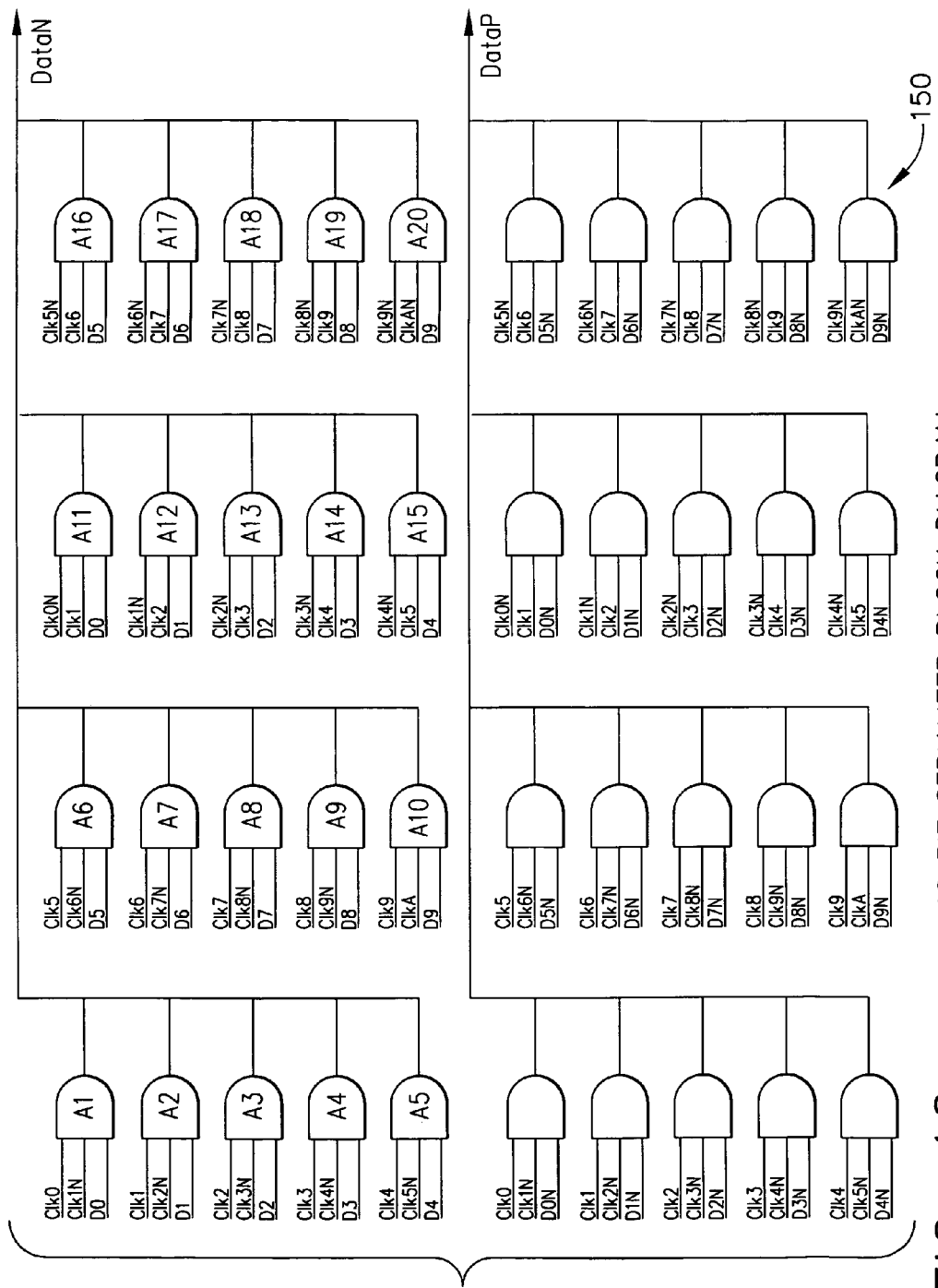
FIG. 12 is a schematic block diagram of a serializer of the transmitter of the present invention.

The ten-bit Serializer block 150, as shown in FIG. 12, and which is part of the 10-bit Serializer block 68, receives ten-bit parallel data and their complements from the Time Multiplexer block 66 and receives clock inputs from the ADLL block 64. The data and clocks are combined logically to transmit D<0> through D<4> serially followed by D<5> through D<9>, and then repeated. In operation, during the time period that the ten-bit Serializer block 68 is serializing D<0> through D<4>, the Time Multiplexer block 66 is loading D<5> through D<9>. While D<5> through D<9> are serialized, D<0> through D<4> are being loaded.

Figure 13:
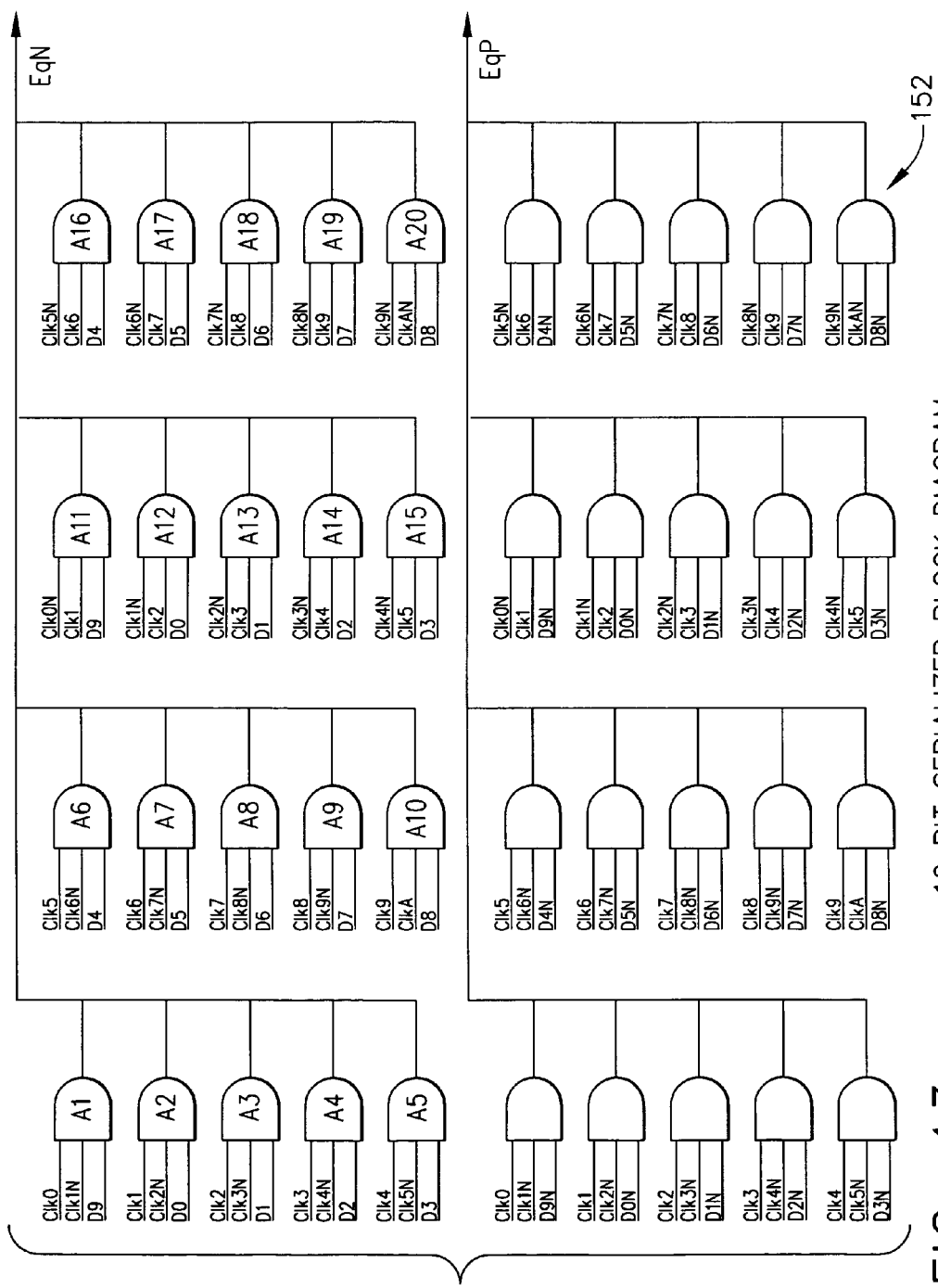
FIG. 13 is a schematic block diagram of a serializer pre-emphasis circuit of the transmitter of the present invention to determine the output power for the current data bit value.

The ten-bit serializer 150 shown in FIG. 12 produces the serial data output for use in a Fibre Channel system. The ten-bit serializer 152 as shown in FIG. 13, and which is part of the ten-bit serializer block 68, is identical in circuitry to the ten-bit serializer 150, but produces a serial output that contains the data bit value previous to a current data bit being output. Outputting the previous data is provided by shifting the data inputs to gates A1 through A20 of the ten-bit serializer 152 by one bit prior with respect to the data inputs of the ten-bit serializer 150. The same shifting is provided for the complements of the data. The generation of two serial bit streams that are offset from each other by one bit provides for integration of a signal pre-emphasis circuit into the Differential Current Sink output driver in the Differential Current Sink block 72 as described herein, and reduces the data latency through the transmitter 44.

Thus, with respect to timing, and referring again to FIG. 9, T<0:19> are loaded at time 100. Beginning at time 119 and ending at time 128, T<0:19> are serialized with T<0> being the first bit output followed by T<1>, T<2> . . . T<19> in sequence.

Figure 14:
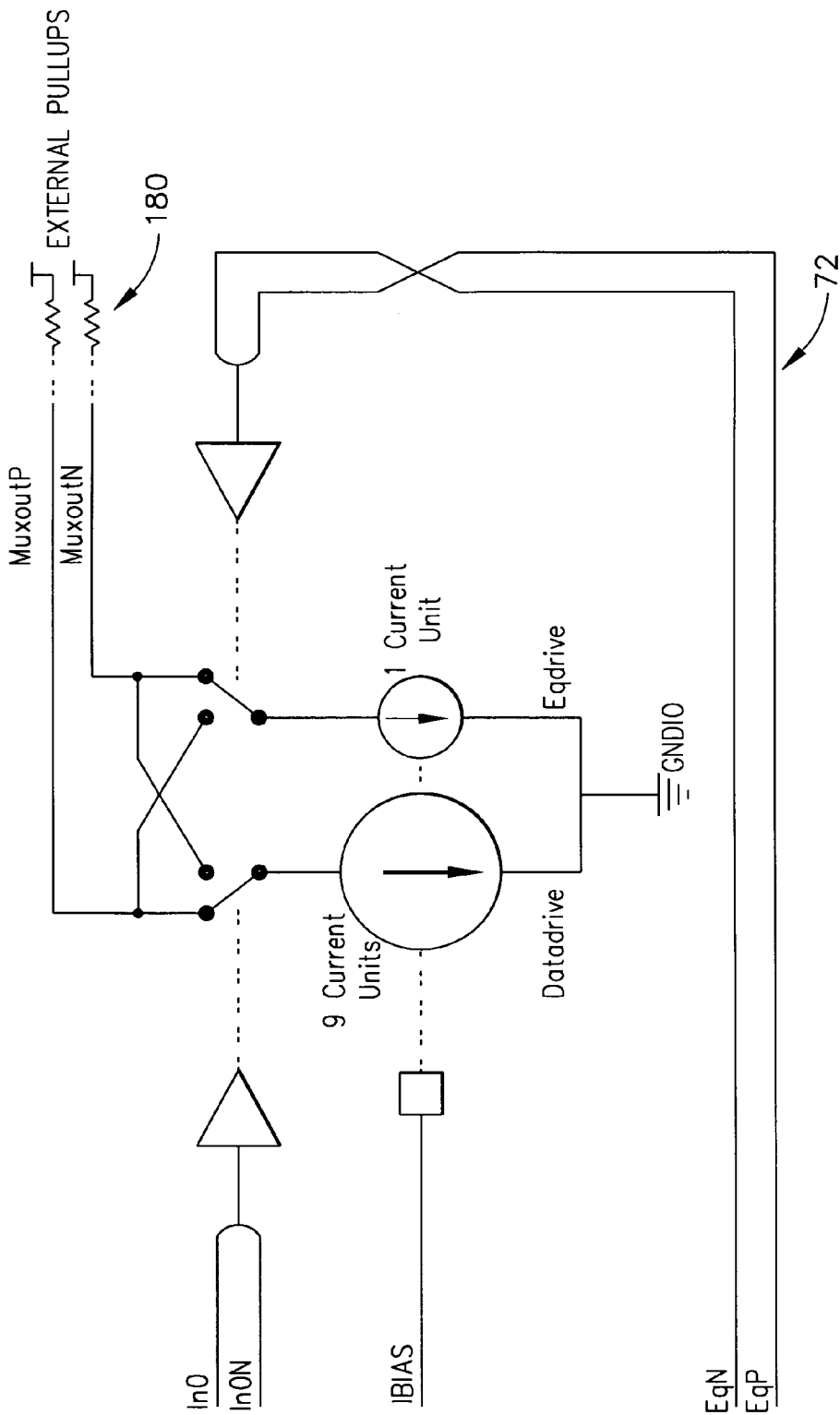
FIG. 14 is a schematic block diagram of a differential current sink of the transmitter of the present invention.

The Differential Current Sink block 72, in combination with external pull-up resistors 180, as shown in FIG. 14, perform a Pseudo (also referred to as Positive) ECL (PECL) translation. Without the external pull-up resistors 180, the Differential Current Sink block 72 provides a low-impedance path to ground for the portion of the differential circuit that is active.

As shown in FIG. 14, the Differential Current Sink block 72 receives differential data inputs on In0 and In0N and the previous bit value on EqP and EqN (pre-emphasis) from the ten-bit Serializer block 68. The output is a current sink on MuxoutP and MuxoutN correlating to the input data and the state of the previous bit data. In operation, the sink current for the asserted output will be 8 "unit values" if the present data bit value equals the previous bit value. If not, then the sink current will be 10 "unit values". The "unit values" are externally programmable via a bias configuration register in the Control Logic block 70. This results in a pre-emphasis of the output drive for every bit transition and reduces the amount of jitter on the PECL output signals. When the In0 and IN0N correlate to a logical one, then nine "unit values" of current will be sunk at MuxoutN by Datadrive. If In0 and IN0N correlate to a logical zero, then nine "unit values" of current will be sunk at MucoutP by Datadrive. Further, when the EqP and EqN correlate to a logical one, then one "unit value" of current will be sunk at MuxoutP by Eqdrive. If EqP and EqN correlate to a logical zero, then one "unit value" of current will be sunk at MuxoutN by Eqdrive. The result is an 8 or 10 (i.e., 9+/−1) "unit value" drive of the PECL output based on sequential bit transitions. This overdrives the MuxoutP/N signals when the data is changing from a one to zero or vice versa, thereby reducing the serial data output jitter.

The Control Logic block 70 provides externally programmable features for the transmitter 44. For example, bias control to each individual block may be provided to allow for incremental programmable power level adjustments. Capacitor values may be adjusted via software to compensate for process variations. Individual blocks may be powered on and off to aid in debugging and testing.

Specifically, and with respect to the Control Logic block 70, it preferably accepts a thirty-two-bit CONFIG_XMT<0:31> register input and an eight-bit CONFIG_CLK<0:7> register input. The functions of these register inputs are preferably provided as follows:

CONFIG_CLK<0:3>—Controls the bias settings for the Clock Generator Block 62.
CONFIG_CLK<4:7>—Reserved.
CONFIG_XMT<0:3>—Controls the Voltage bias settings for the ADLL 64.
CONFIG_XMT<4:7>—Controls the Current bias settings for the Differential Current Sink Block 72.
CONFIG_XMT<8:11>—Controls the Voltage bias settings for the phase detector.
CONFIG_XMT<12:15>—Controls the Voltage bias settings for the Filter circuit.
CONFIG_XMT<16:19>—Controls the Voltage bias settings for the ten-bit Serializer Block 68.
CONFIG_XMT<20:23>—Controls the Voltage bias settings for the Differential Current Sink Block 72.

CONFIG_XMT<24:27>—Adjusts the internal capacitor Filter Pole settings.

CONFIG_XMT<28:31>—Adjusts the internal capacitor Filter Zero settings.

It should be noted that these configuration registers have internal pull-up/pull-downs to establish a default register setting for a nominal operating mode.

Figure 15:
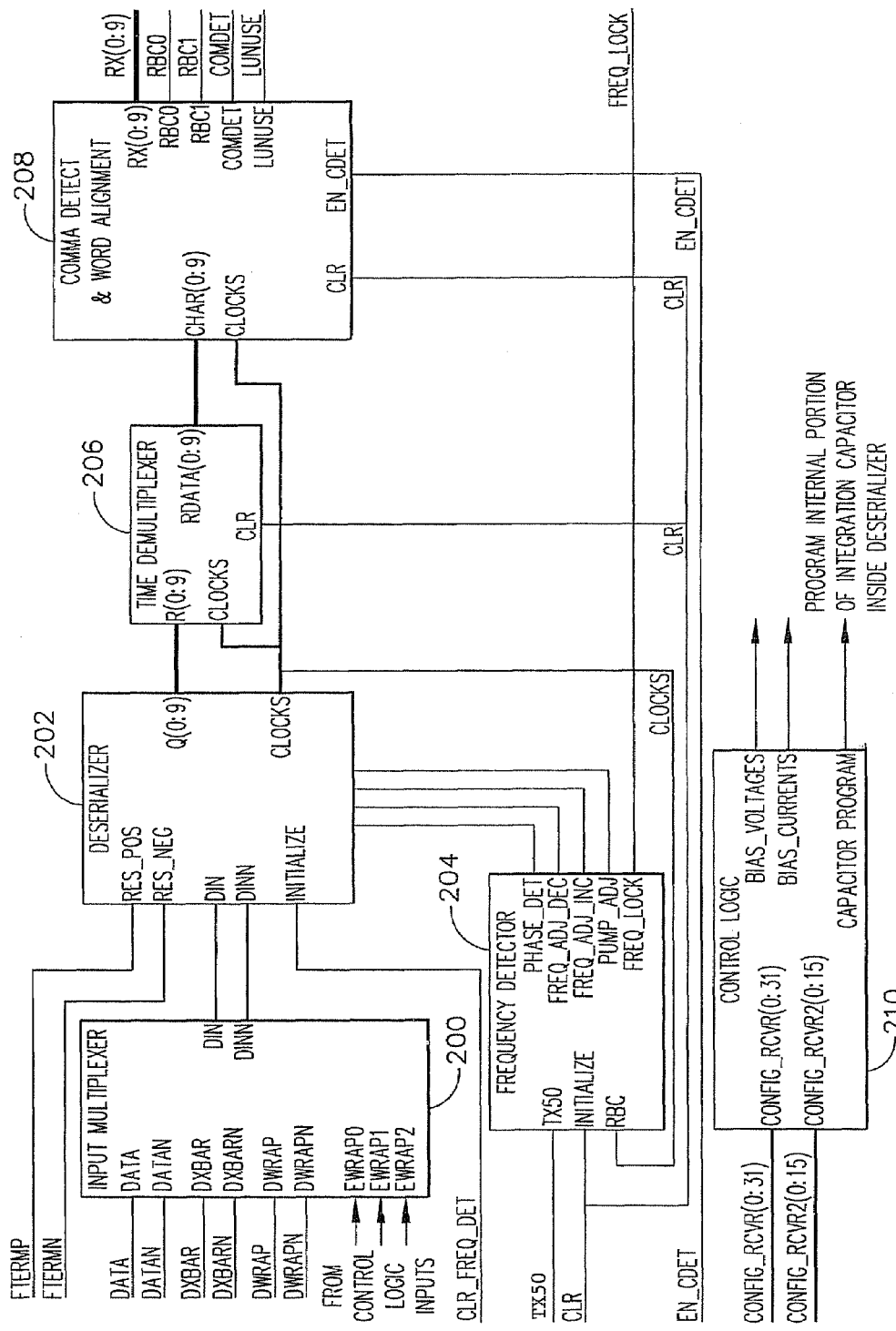
FIG. 15 is a schematic block diagram of a receiver of the present invention.

Referring now to the receiver 42, a single high-speed (i.e., Fibre Channel) serial data stream 46 is received and translated into a ten-bit parallel data stream 48 at 1/10th the input rate. In a particularly preferred embodiment, as shown in FIG. 15, the receiver 42 receives three differential serial data streams at 1.0625 Gbps each. A 3:1 Analog Input Multiplexer 200 allows external digital control to select one of three differential channels: DATA, DXBAR or DWRAP. It should be noted that the content of each serial input conforms to the Fibre Channel (FC) standard, and special Fiber Channel "comma" characters are used to provide word boundary alignment.

Generally, the output (DIN) of the 3:1 Analog Input Multiplexer block 200 is converted to parallel data by the Deserializer block 202. The Deserializer block 202 generally includes a bank of receive amplifiers 222 (i.e., a receiver amplifier register 220), a Voltage Controlled Ring Oscillator (VCRO) 228, phase detectors, and an integration capacitor and associated control circuits. In operation, the serial data is sampled by the receive amplifiers with a specific phase locked relationship. The VCRO 228 tracks the incoming data and adjusts the phase relationship of its ten output clocks such that the data sample is taken in the middle of each data bit. The VCRO 228 is tuned with an internal programmable integration capacitor that sets the pole frequency of a loop filter. Two external, discrete components are used to set the loop filter's zero frequency.

A Frequency Detector block 204 monitors the Receive Byte Clock (RBC) clock signal that is output from the VCRO 228. In operation, and as described in more detail herein, the frequency of RBC is compared against an external reference clock source (TX 50). If the frequency of the internal RBC clock and the TX 50 reference signal are within 5 MHz, the Frequency Detector block 204 will relinquish control of the VCRO 228 control loop to the phase detector. The phase detector will then continuously track the incoming data stream in order to keep the VCRO phase locked to the serial input data. When the frequency difference between the RBC and the TX 50 clocks are within 5 MHz, the Frequency Detector block 204 will assert the FREQ_LOCK output signal.

The output of the receive amplifiers are the last ten bits received from the input data stream. These ten outputs are labeled Q(0:9). Each of the ten bits are valid at separate times.

A Time Demultiplexer block 206 receives the data Q(0:9) and aligns the bits into parallel words that are valid during the same time period. This re-timed data from the Time Demultiplexer block 206 is referenced as RDATA(0:9).

The re-timed ten-bit data, (RDATA(0:9)) is provided to a Comma Detect and Word Alignment (CDET_DA) block 208. The CDET_DA block 208 preferably stores a thirty-bit history of data that has been received. The thirty-bit history is scanned for a special FC "comma" character. When the "comma" character is detected, the CDET_DA block 208 will re-align its ten-bit data words such that the "comma" character is output at bit locations (0:6). This alignment is maintained for all future serial data received until the next "comma" character is detected. The RX(0:9) output from the CDET_DA block is a ten-bit parallel word representing the serial input data aligned to the original word boundaries. The COMDET output signal indicates that a "comma" character has been detected. The action of the CDET_DA block 208 is controlled externally with the reset (CLR) and Enable Comma Detect (EN_CDET) input signals.

The CDET_DA 208 block also provides two output clock signals: RBC0 and its complement RBC1. The frequency of these clocks is 106.25 MHz. This frequency is one tenth the serial data bit rate. These clocks indicate when data is available to be read from the parallel output register RX<0:9>. Additionally, a signal referenced as LUNUSE will go high to indicate an inactive bus containing all zeros or all ones in the input data stream.

The Control Logic (DEMUX_BIAS) block 210 receives external digital commands and provides programmed bias voltages and currents to the other blocks. Both a thirty-two-bit parallel input bus and a sixteen-bit parallel input bus are included to provide external control of the Input Multiplexer block 200, the phase locked loop integration capacitor value, and the bias voltages and currents of the other blocks. This provides for final characterization and determining optimum bias conditions after the receiver 42 has been fabricated, as well as aiding in testing and debugging.

Referring specifically to the Input Multiplexer block 200, it provides for selecting serial data from one of three input channels: DATA, DXBAR, and DWRAP. The input signal EWRAP0 is asserted to select the DATA channel. The input signal EWRAP1 is asserted to select the DXBAR channel. The input signal EWRAP2 is asserted to select the DWRAP channel. These EWRAP signals are preferably mutually exclusive. The EWRAP0, EWRAP1, and EWRAP2 signals are provided from the Control Logic block 210. The Input Multiplexer 200 provides the receiver 42 with greater flexibility in system integration, as well as testing and debugging.

Figure 16:
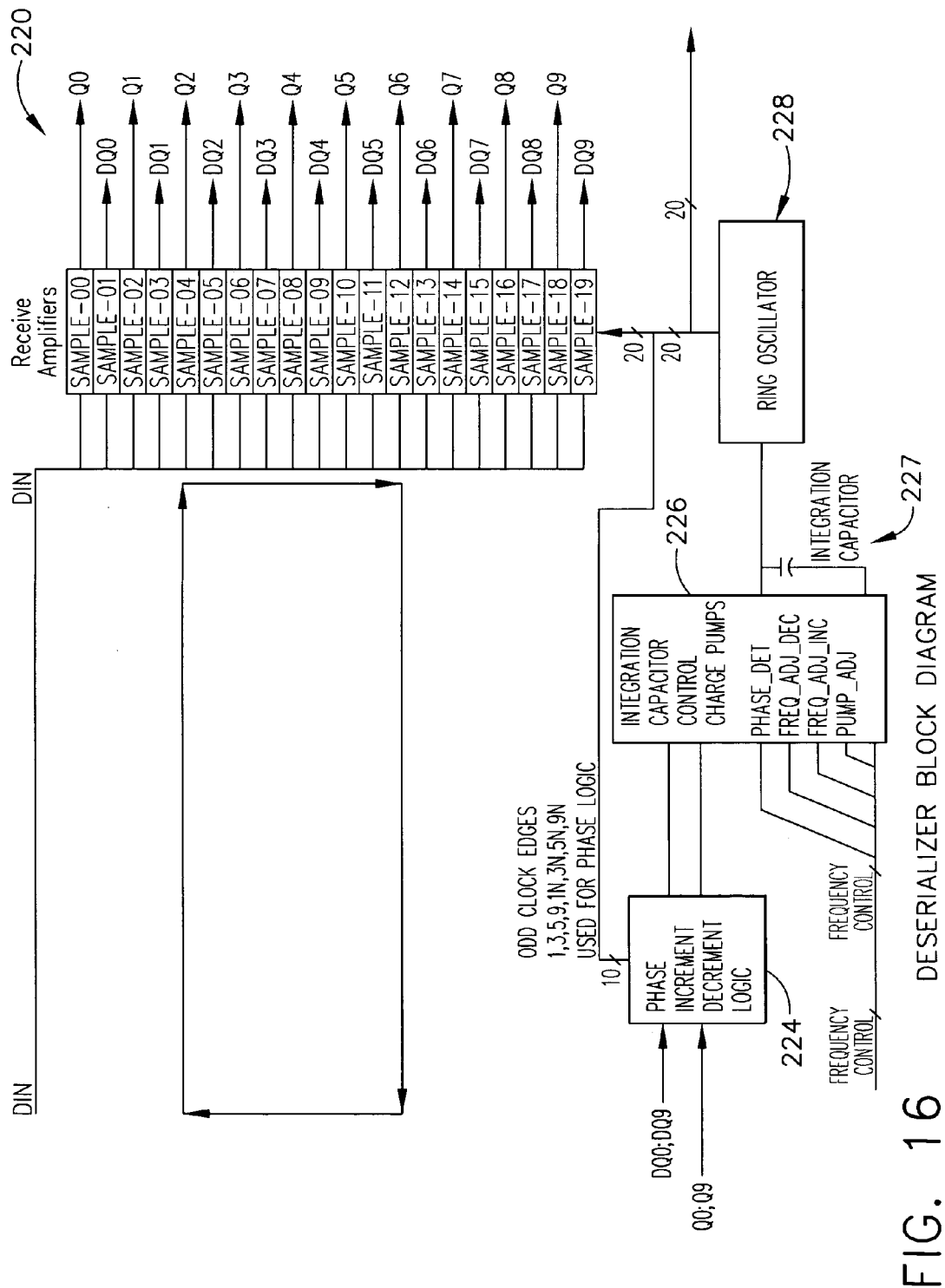
FIG. 16 is a simplified block diagram of a deserializer of the receiver of the present invention.
Figure 17:
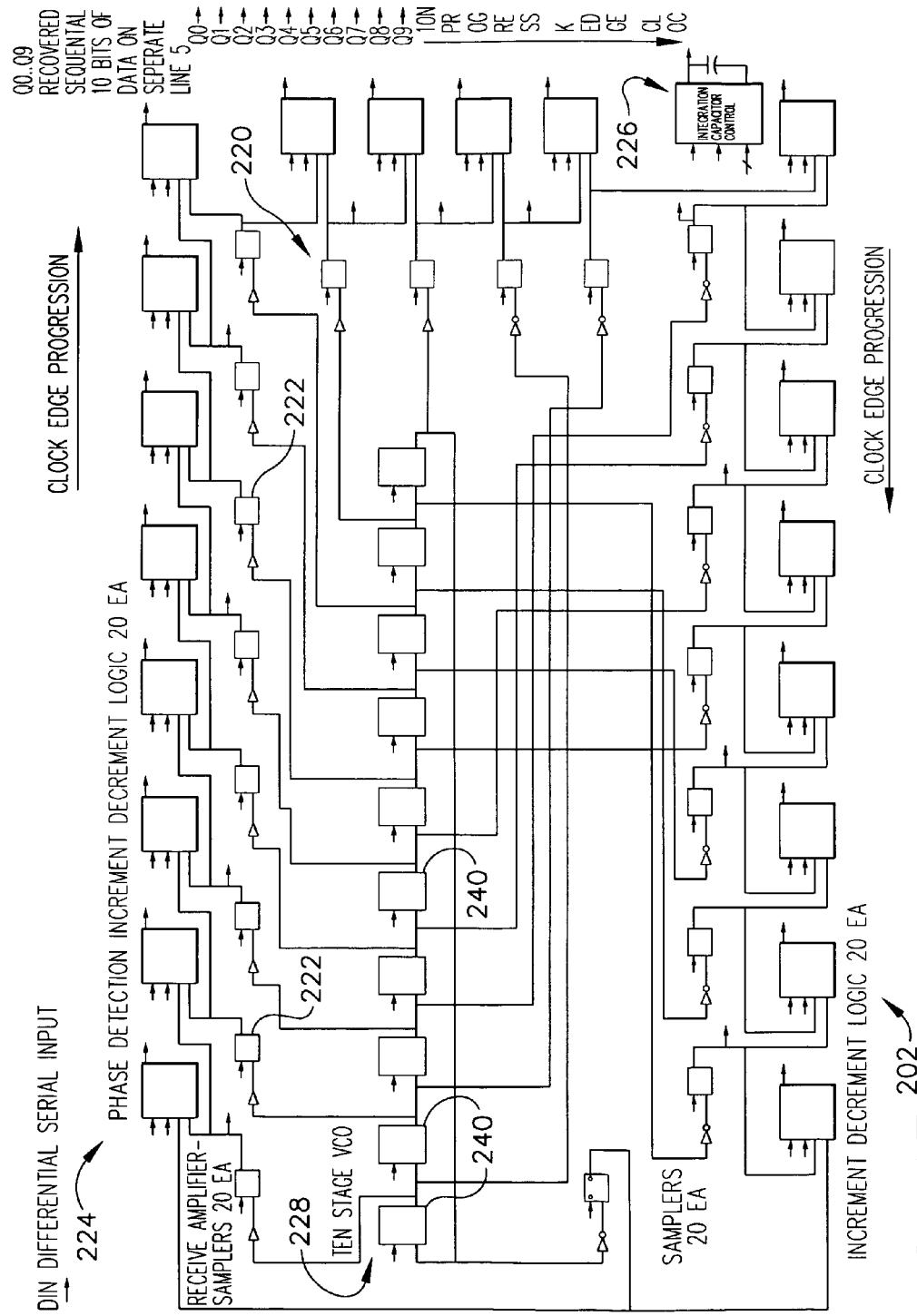
FIG. 17 is a detailed schematic block diagram of the deserializer of FIG. 16.

Referring now to the Deserializer block 202, it preferably consists of the following: a bank of receive amplifiers, a Voltage Controlled Ring Oscillator (VCRO) 228, phase detectors, and an integration capacitor 227 and associated control circuits. The primary frequency of the VCRO 228 is 106.25 MHz. As shown more specifically in FIGS. 16 and 17, the receive amplifier (RECAMP) register 220 comprises twenty sequentially clocked sampling amplifiers. The bits of this register are labeled Q0-Q9 and DQ0-DQ9. As shown in FIG. 17, the RECAMP register 220 is implemented as current mode logic D-type flip-flops 222 (i.e., receive amplifiers). The data input to every RECAMP register 220 sampling amplifier is the buffered serial differential input data stream (DIN) from the 3:1 Input Multiplexer 200. It should be noted that this data stream has a bit rate of 1.0625 Gbps. The twenty sequential clocks to the RECAMP register 220 are derived from the rising and falling edges of the output clocks of the VCRO 228. The output of the receive amplifiers 222 are the most recent ten bits received.

Figure 18:
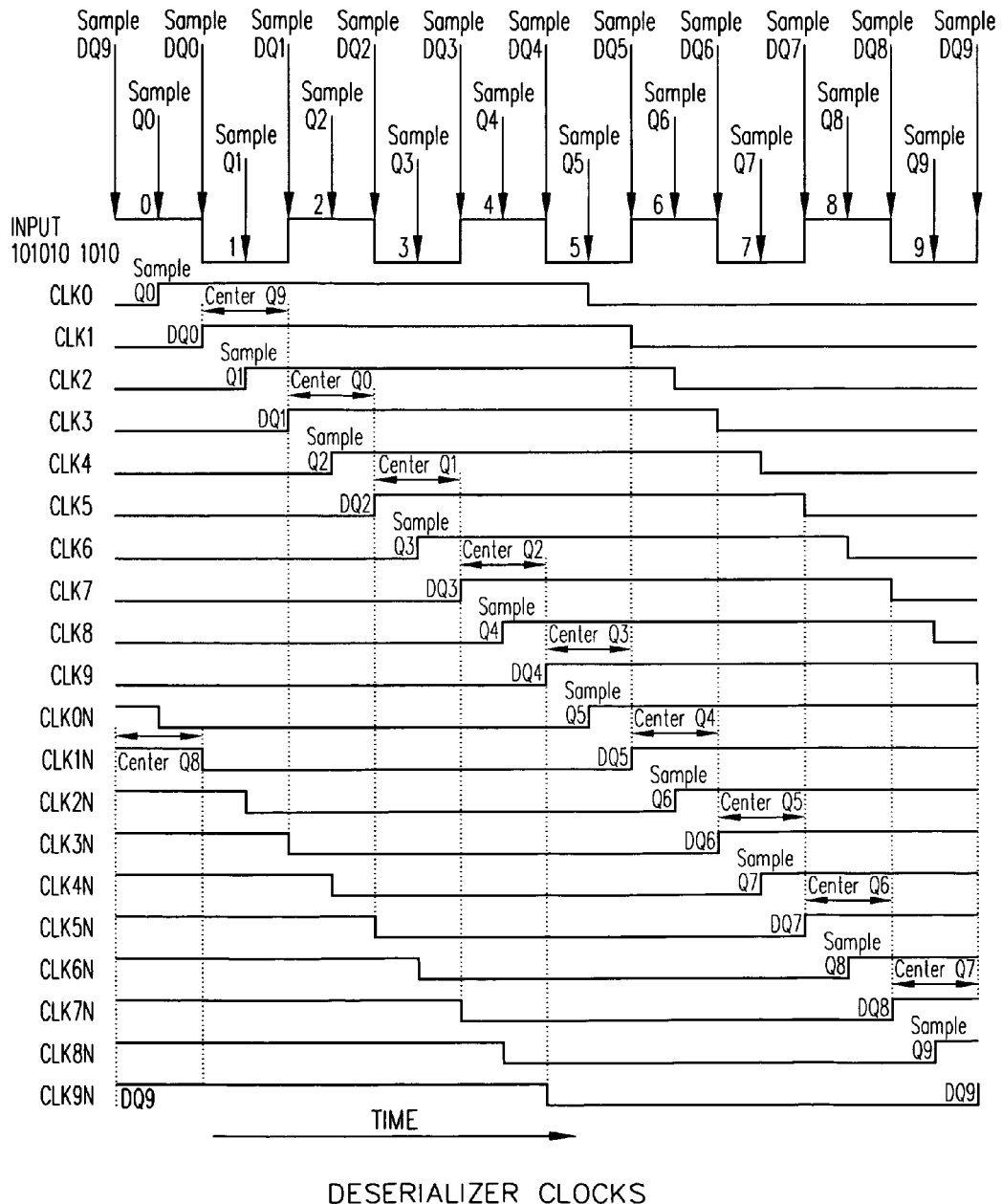
FIG. 18 is a timing diagram of the deserializer clocks.

The phase increment/decrement logic 224, charge pump 226, loop filter, and ten-stage VCRO 228 together form a Phase Locked Loop (PLL), which may be constructed with known electronic components. The twenty outputs of the VCRO 228 provide each receive amplifier 222 with a sampling clock signal. In operation, the sampling time for the samples Q1 through Q9 occurs in the middle of the time during which that individual bit is present at the data input DIN. The time for the samples DQ0 through DQ9 occurs at the transition boundaries between bits. FIG. 18 shows the VCRO 228 clock relationships. The Q0-Q9 and DQ0-DQ9 samples provide the phase increment/decrement logic 224 with the data necessary to maintain this required phase relationship. During the time it takes for DIN to present 10 serial bits, there are 20 equally spaced time samples taken. Two samples per bit, where the first sample taken is Q0 and the last sample taken is DQ9. The phase increment/decrement logic 224 produces a correction pulse (i.e., INCBUS or DECBUS output) to correct the phase relationship of the VCRO 228 clocks.

The charge pump 226 increases or decreases the voltage of the integration capacitor 227. Inputs to the charge pump 226 are derived from two sources: the Frequency Detector block 204 and the phase increment/decrement logic 224. The Frequency Detector block 204 provides the primary charge pump 226 controls. The Frequency Detector block 204 provides for raising and/or lowering the frequency of the VCRO 228 until it is within 5 MHz of the target operating frequency. When this is achieved, the Frequency Detector block 204 relinquishes control to the phase detector. The phase detector continuously tracks the serial input data stream to keep the phase relationships of the VCRO 228 clocks properly aligned to the serial input data.

Thirteen clocks from the VCRO 228 are provided as outputs from the Deserializer block 202. Ten of these clocks are used by the Time Demultiplexer block 206 to convert the ten individual outputs Q0 through Q9 into a ten-bit parallel output. Two clocks are buffered and retransmitted by the Time Demultiplexer block 206 as the RBC0 and RBC1 clocks. One clock will be used by the Frequency Detector block 204 to compare the frequency of the VCRO 228 to an external reference clock (TX 50).

Referring again to FIG. 18, the relationship of the twenty clocks generated by the VCRO 228 is shown therein with an exemplary serial input of DIN of [1010101010]. In this example, the data sampling is occurring exactly at the desired times. The DQ samples occur at the transition times between bits, and the Q samples occur during the middle of the time during which a bit is present.

Referring now specifically to FIG. 17, and the Deserializer block 202 shown therein, ten voltage controlled delay elements 240 are provided using differential amplifiers. The VCNTL voltage controls the bias currents for these amplifiers. The bias currents determine the output slew rate, which sets the delay time through each amplifier stage. These amplifiers are preferably all constructed on the same IC, with each of the ten voltage controlled delay stages providing the same amount of delay as a function of the voltage VCNTL. Buffers and inverters convert the ten delay element 240 output signals (D0 through D9) into the ten clocks CLK0 through CLK9 and their inverse CLK0N through CLK9N.

Figure 19:
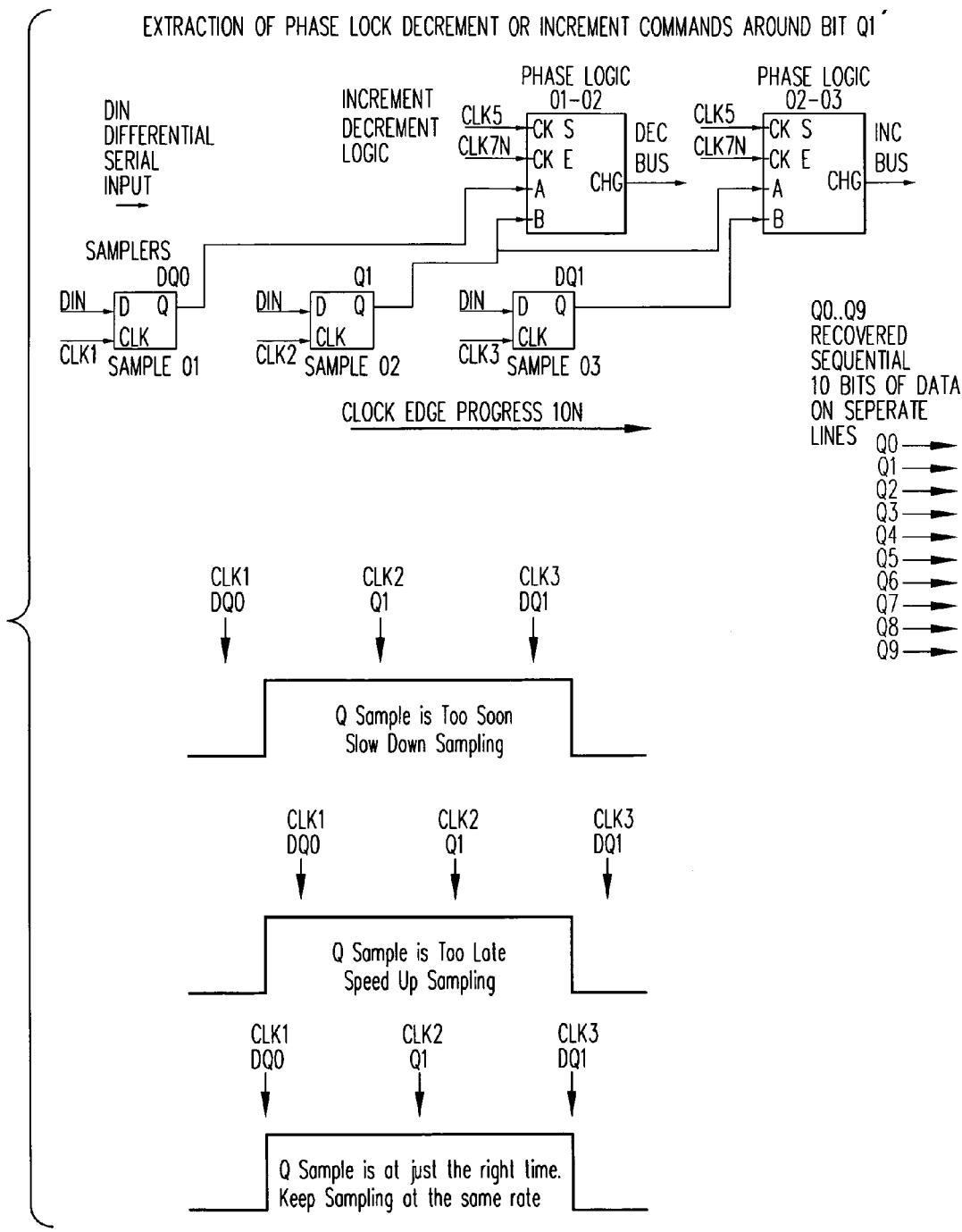
FIG. 19 is a timing diagram for phase detection of the deserializer of FIG. 16.
Figure 20:
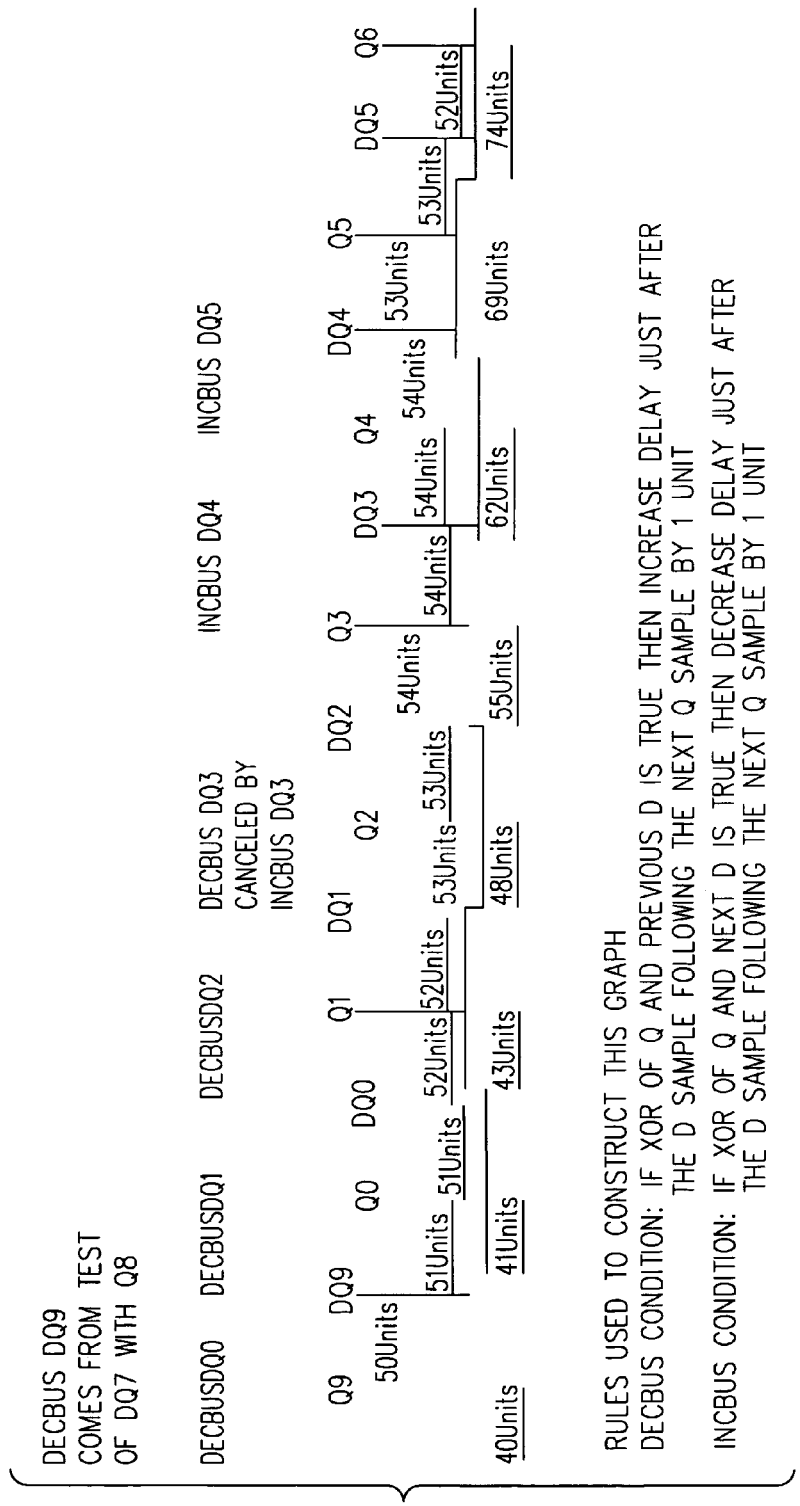
FIG. 20 is a timing diagram example for phase detection of the deserializer of FIG. 16 showing delays.

The outputs of the twenty receiver amplifiers 222 are provided to the phase detection logic 224. In operation, one and a half bit time periods after a 'Q' sample is taken, which is identified in FIG. 18 as a 'Center Q' time period for that 'Q' sample, the 'Q' sample is compared with the 'DQ' sample that occurred in time just prior to it. If the 'DQ' sample prior to the 'Q' sample is the opposite state of the 'Q' sample, then a DECBUS pulse is generated for that specific 'Center Q' time period. During the same 'Center Q' time period the 'Q' sample is compared to the 'DQ' sample just after it. If the 'DQ' sample just after the 'Q' sample is the opposite state of the 'Q' sample, then an INCBUS pulse is generated for that specific 'Center Q' time period. FIG. 19 shows the comparison of the Q1 sample to the sample just before it, DQ0, and the sample just after it, DQ1. As shown therein, the 'Center Q1' time period is the time during which both CLK5 and CLK7N are high. Shown in FIG. 20 is an example of the effect of the INCBUS and DECBUS commands on the delay between samples.

The phase detection logic 224 for the INCBUS and DECBUS signals are built using 4-input pseudo "AND" Gates. These "AND" gates are combined to perform an additional XOR/XNOR function. The outputs from the AND-XOR/XNOR functions determine the sinking of current on the INCBUS/DECBUS control lines. All the INCBUS commands are "hard wire ORed" together at the same node. All the DECBUS commands are "hard wire ORed" together at the same node. The phase logic INCBUS/DECBUS commands keep the clocks in a phase relationship with the incoming serial data DIN such that the even samples are centered on the incoming bits, and the odd samples are on the edges between the incoming bits.

In operation, if the sampling is occurring too early in time, a "decrease charging current" (DECBUS) command is generated that results in charge being removed from the integration capacitor 227, which decreases the control voltage VCNTL of all the VCRO 228 delay elements 240. A decrease in the control voltage of the delay elements 240 results in an increase in the delay period between samples through the delay elements 240. The result is that sampling occurs more slowly, thus shifting the Q samples to the right and more towards the center of the bits being sampled.

If the sampling is occurring too late in time, an "increase charging current" (INCBUS) command is generated that results in charge being deposited into the integration capacitor 227, which increases the control voltage VCNTL of all the VCRO 228 delay elements 240. An increase in the control voltage of the delay elements 240 results in a decrease in the delay period between samples through the delay elements 240. The result is that sampling occurs more quickly, thus shifting the Q samples to the left and more towards the center of the bits being sampled. If the sampling is occurring at the correct time, no commands are given to change the delay period between samples.

With respect to the Frequency Detector block 204, it is preferably implemented using VHDL (VHSIC Hardware Description Language) synthesis and is a digital CMOS implementation. This provides a high-precision, low power method of performing frequency comparison between two different clock sources.

Figure 21:
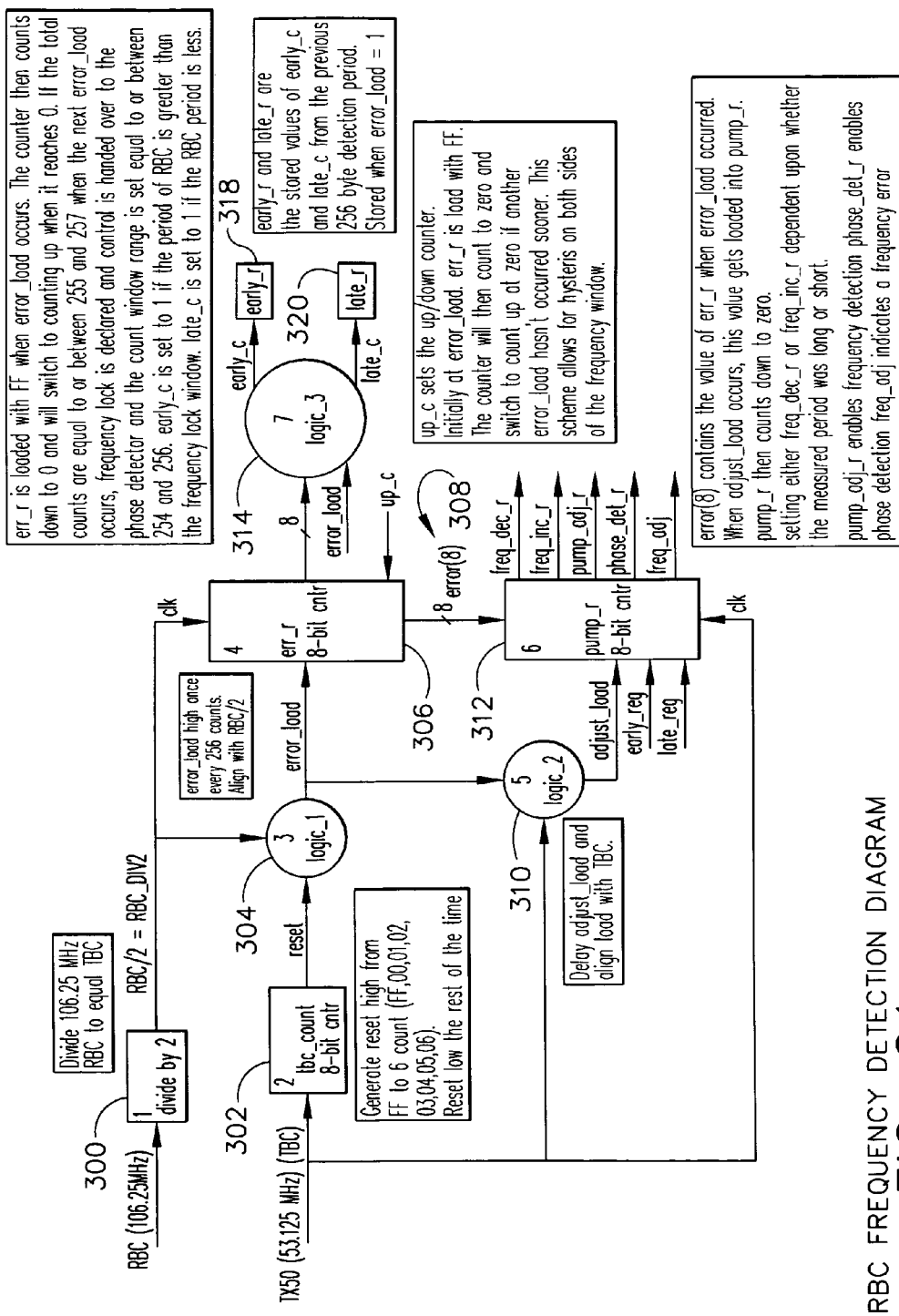
FIG. 21 is a flow diagram of a frequency detector of the receiver of the present invention.

Specifically, and referring to FIG. 21, in operation, the Frequency Detector block 204 preferably receives two clocks, TX50 and RBC/2, which are compared by counting 256 cycles of TX50. This value is then compared to the number of RBC/2 cycles during the same time period. In operation, if the counts are within two TX50 clock cycles, then a "target frequency lock" is declared. If the total RBC/2 counts are less than the target, then freq_dec_r will be set to 1, which causes the integration capacitor control 226 (i.e., charge pump) in the Deserializer block 202 to increase the loop voltage, which in turn decreases the RBC period. If the total RBC/2 counts are greater than the target, then freq_inc_r will be set to 1, which causes the integration capacitor control 226 (i.e., charge pump) to decrease the loop voltage, which in turn increases the RBC period.

As shown in FIG. 21, a divide by two circuit divides the RBC clock by two at 300. The resultant RBC_DIV2 signal is then compared to the reference TX50 clock. The Tbc_count block 302 counts 256 cycles of TX50 and asserts the 'Reset' signal high from count 255 through count 6 (i.e., Hex values FF, 00, 01, 02, 03, 04, 05, 06), for a total of eight cycles. The 'Reset' signal is low for the remainder of the counts. At 304, Logic_1 generates an 'error_load' signal and aligns it with RBC/2 once every 256 cycles of the Tbc_count. The 'Error_load' signal causes the 'err_r' counter 306 to be loaded with hexadecimal FF and the previous countdown value to be stored in error(8) as shown at 308. At 310, a Logic_2 pulse extends the 'error_load' signal and aligns it to the positive transition of the TX50 clock. Next, it loads error(8) into the pump_r counter 312 (i.e., adjust counter). The 'error_load' signal is pulse extended so that the Frequency Detector block 204 can operate down to an RBC/2 frequency eight times slower relative to the VCRO 228 than if it was in frequency lock. This prevents a startup VCRO 228 period being much slower than desired.

Additionally, a pulse extender is preferably provided to synchronize components running off the TX50 clocking to load pulses generated from the RBC_DIV2 clocking. This pulse extender allows the Frequency Detector block 204 to run at an RBC/2 frequency that is three times greater relative to the VCRO 228 than if it was in frequency lock. It should be noted that the Tbc_count defines the clock period to which the RBC/2 signal is compared. The Tbc_count sets the control signal that starts and stops the err_r counter 306, which counts the RBC/2 signal. These control signals are preferably periodically updated once every 256 cycles of TX50.

In operation, if frequency lock has not yet been established, the err_r counter 306 counts down from 255 (i.e., FF) to zero, after which the counter direction is then set to count up. Thus, detection of an RBC/2 frequency that can be either greater or less than the TX50 frequency is provided. At the next 'error_load' signal, the contents of the 'err_r' counter 306 and the present count direction are compared by logic_3 at 314 to determine if the value of 'err_r' is within the frequency lock window. If the count value of 'err_r' is greater than 1, and the count direction is down, then an 'early_c' signal will be set to one. If the count value of 'err_r' is greater than 1, and the count direction is up, then a 'late_c' signal will be set to one. The values of 'early_c' and 'late_c' are stored in an 'early_r' register 318 and 'late_r' register 320, respectively. If the count value of 'err_r' falls within the previously described window, then both 'early_c' and 'late_c' will be set to zero, and "frequency lock" will be declared. When "Frequency Lock" is declared, the VCRO 228 loop control will be handed over to the phase detector logic 224.

The pump_r counter 312 is loaded with the value in error (8) when the 'adjust_load' signal is asserted. Error(8) contains the previous value of the err_r counter 306 when the prior 'error_load' signal occurred. The pump_r counter 312 then counts down to zero with each positive transition of TX50. If 'early_reg' is set to one, then 'freq_dec_r' will be set to one for the time period it takes the pump_r counter 312 to count down to zero, which causes the integration capacitor control 226 (i.e., charge pump) to increase the loop voltage (VCNTL). This in turn decreases the RBC period. If 'late_reg' is set to one, then 'freq_inc_r' will be set to one for the time period it takes pump_r counter 312 to count down to zero. This causes the integration capacitor control 226 (i.e., charge pump) to decrease the loop voltage (VCNTL). This in turn increases the RBC period. This process will continue until frequency lock is achieved (i.e., the count value of 'err_r' falling into the "frequency lock" window). At this point, the 'pump_adj_r' signal is set to zero and 'phase_det_r' will be set to one, to allow the phase detector 224 to take control of the VCRO 228 control loop. The Frequency Detector block 204 will wait 512 TX50 clock cycles before monitoring the loop again. This "hold-off" time allows sufficient time for loop control hand-off to the phase detector 224.

Figure 22:
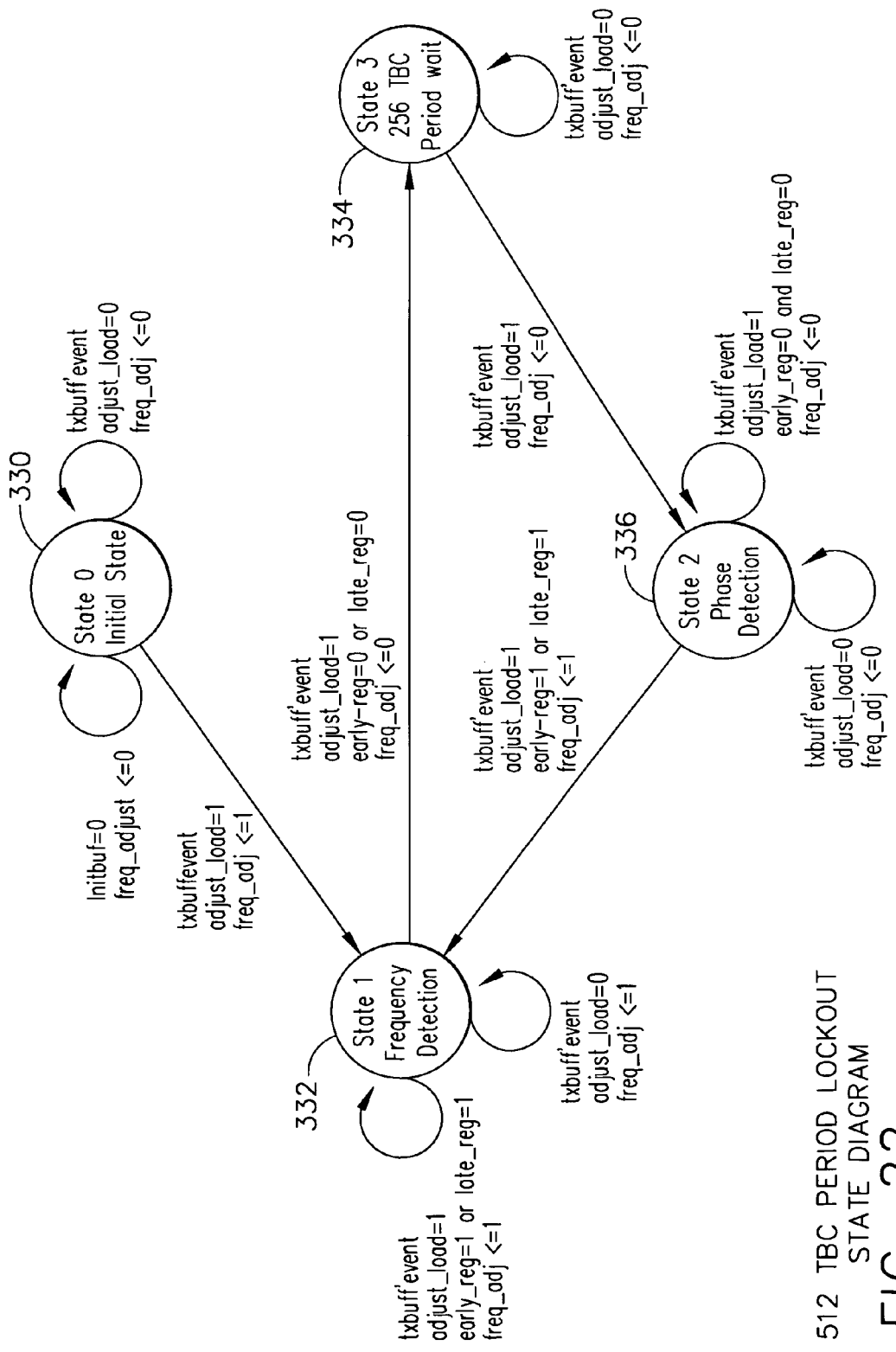
FIG. 22 is a state diagram of the lockout function of the frequency detector of FIG. 21.

A state diagram representation of the Frequency Detector block 204 is shown in FIG. 22. As shown therein, the Frequency Detector block 204 causes the receiver 42 to lock within +/−5 MHz of the effective 1.0625 Gbps receive serial data bit rate. Once "frequency lock" is achieved, control of the loop is handed over to the phase detector 224. The Frequency Detector block 204 will wait 512 TX50 clock cycles after it has previously declared "frequency lock" before re-monitoring the RBC clock and the phase detector 224 for active frequency lock.

A logic zero on the signal 'initbuf' (i.e., CLR/INITIALIZE signal in FIG. 15) forces the state machine to State 0 at 330. The state machine will remain in this state until the 'adjust_load' signal generated by the TBC counter 302 goes high. At this point the state machine enables frequency adjustment by setting the 'freq_adj' signal to high. It also disables phase adjustment and then proceeds to State 1 at 332. State 0 will not be entered again until the 'initbuf' signal is again set to low. It should be noted that all state transitions occur on the rising edge of the TBC clock. This is depicted as a 'txbuff' event in FIG. 22. When transitioning from State 0 at 330 to State 1 at 332, the Frequency Detector block 204 preferably enters a frequency comparison mode before determining whether to increment or decrement the loop voltage.

The state machine will stay in State 1 until "frequency lock" occurs. This is determined by comparing 256 cycles of the TX50 clock with the number of RBC/2 clock cycles during the same time period. If the counts are within plus or minus two counts of each other, then the 'early_reg', 'late_reg', and 'freq_adj' signals will be set to zero to signify that "frequency lock" has occurred. Loop control is then handed over to the phase detector 224 and the state machine then enters State 3 at 334. State 3 waits 512 TX50 cycles, and then proceeds to State 2 at 336.

In State 2, the Frequency Detector block 204 begins monitoring the 'early_reg' and 'late_reg' signal for the correct frequency range. In State 2, the frequency range window is preferably expanded by +/−2 TBC periods, for a total of five periods while the phase detector 224 is in control of the VCRO 228 loop. This prevents the Frequency Detector block 204 from taking over the control loop when the RBC signal changes by a small amount. As long as the phase detector 224 controls the loop correctly, the state machine will stay in State 2. If the RBC signal drifts out of the lock frequency range, then the 'freq_adj' signal will be set to 1, phase detection disabled, and the state machine moves back to State 1 at 332, and the frequency detection process is repeated.

It should be noted that the incoming RBC clock is at one-tenth the frequency of the 1.0625 Gbps data stream. Further, the RBC clock is divided by two before comparing it to the TX50 clock, which provides an RBC/2 period of:

1/1.0625 GHz*twenty=18.8235294 nSecs to be compared with

1/53.125 MHz=18.8235294 nSecs per TX50 count

During each frequency detection cycle, 256 TX50 pulses are counted which produce a total time of:

256*18.8235294 nSecs=4.81882353 uSecs

During frequency detection, the frame lock window can vary three TX50 periods (i.e., the total clock pulses counted must equal 255, 256 or 257) before declaring "frequency lock".

For example, assuming 257 clocks were counted during the detection period, the effective frequency of the RBC/2 would be calculated as follows:

257/4.81882353 uSecs=53.332519 MHz

This is then multiplied by twenty samples per ten bit word period, resulting in an effective frequency of:

20*53.332519 MHz=1.066650390 GHz

This frequency is then compared to the ideal frequency of 1.0625 GHz, and the determined error is:

1.066650390 GHz−1.0625 GHz=4.150390 MHz

After the frequency lock has been established and phase detection is activated, the window range of the number of clocks counted must fall within 254, 255, 256, 257 and 258. It should be noted that the error at a count value of 258 is 8.3 MHz. Further, these calculations and determinations are based upon a TX50 clock of 53.125 MHz. These calculations and determinations may be modified as needed and depending upon the particular system requirements.

Figure 23:
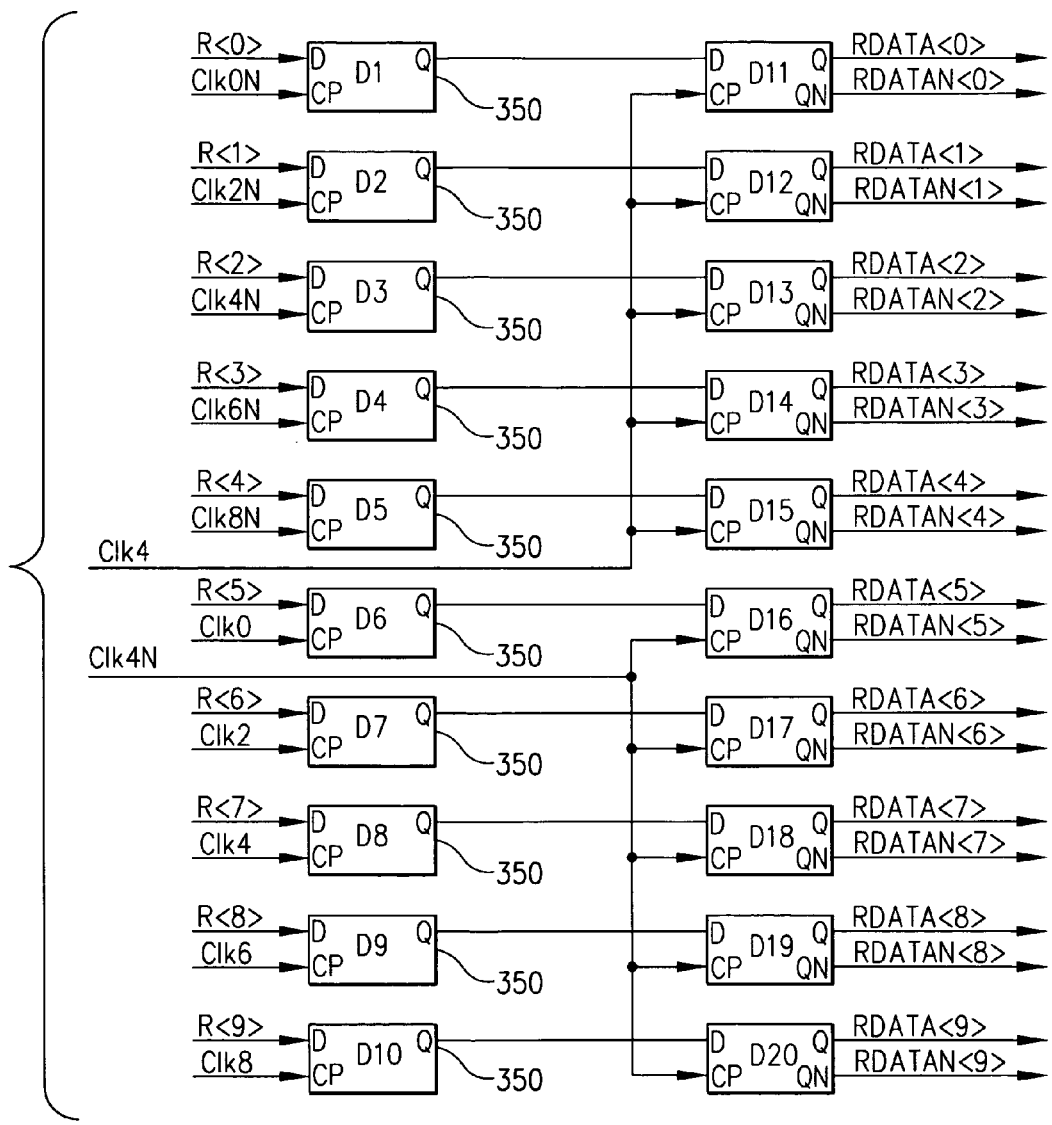
FIG. 23 is a schematic block diagram of a time demultiplexer of the receiver of the present invention.

Referring now to FIG. 23 showing the Time Demultiplexer block 206, the data bus inputs R<0:9> correlate to the Deserializer block 202 outputs Q0 through Q9 shown in FIG. 17. The clock inputs for the Time Demultiplexer block 206 are shown in FIG. 24.

Figure 24:
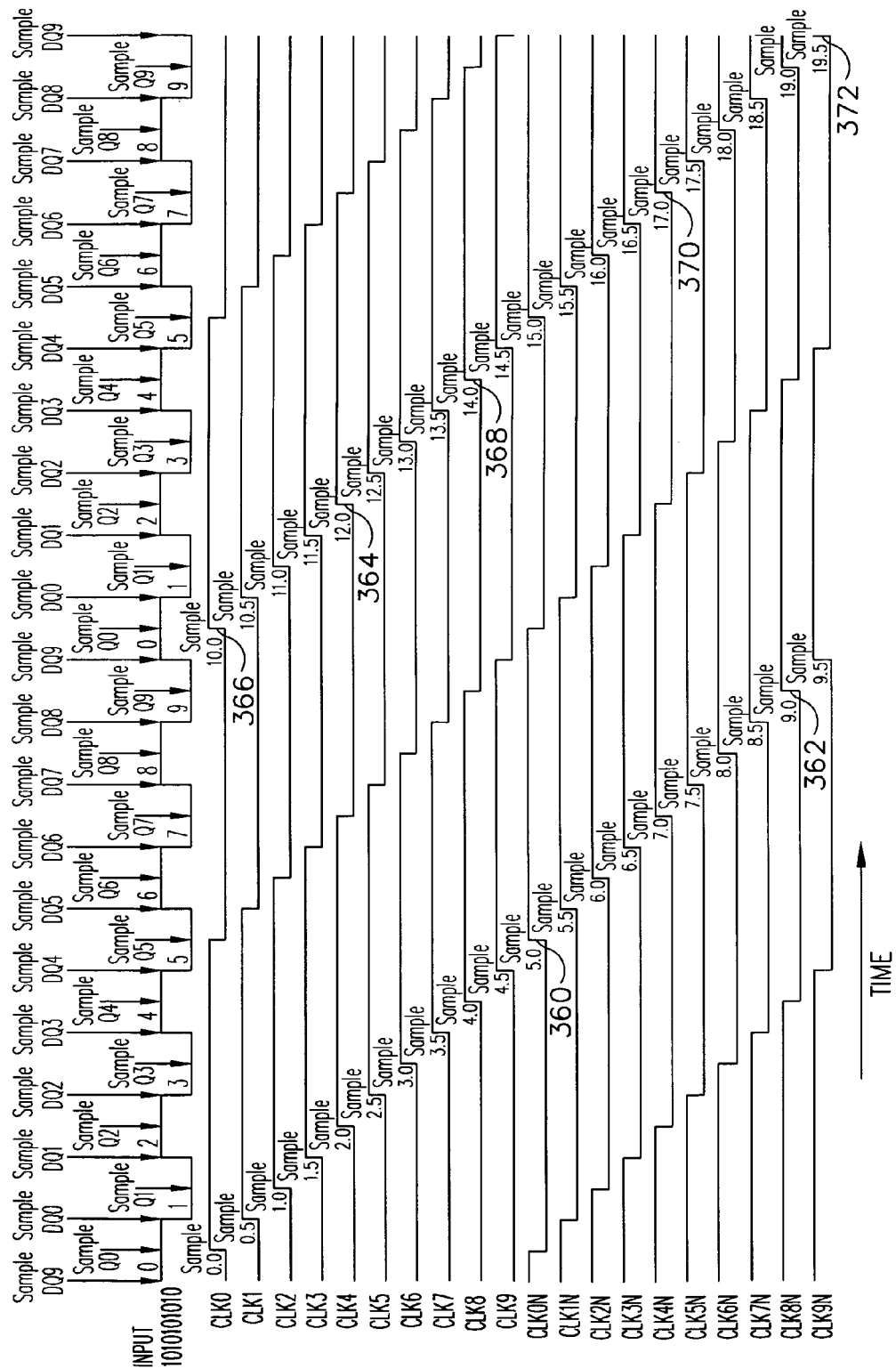
FIG. 24 is a timing diagram of clocks for the demultiplexer of FIG. 23.

As shown in FIGS. 23 and 24, each individual data bit is preferably clocked into the flip-flops 350 (i.e., D1 through D10) five bit periods after the individual bit data has been sampled by the Deserializer block 202. Referring specifically to flip-flops D1 through D5, D1 is loaded at Sample (5.0) at time 360, and D5 is loaded at Sample (9.0) at time 362. D1 through D5 then are then loaded into RDATA<0:4> at Sample (12.0) at time 364. Referring specifically to flip-flops D6 through D10, D6 is loaded at Sample (10.0) at time 366 and D10 is loaded at Sample (14.0) at time 368. D6 through D10 are then loaded into RDATA<5:9> at Sample (17.0) at time 370, which completes the loading of RDATA<0:9>. The RDATA<0:9> bus is then routed to the Comma Detect and Word Alignment block circuitry 208 which reads RDATA on the rising edge of the CLK9N clock, which occurs at Sample (19.5) at time 372.

It should be noted that when reference is made to circuitry, this refers to the component parts of a specific block as described herein.

The Comma Detection and Word Alignment block 208 preferably provides the following functions:

1) A seven-bit FC "comma" character recognition and ten-bit data word alignment.

2) Output of each received ten-bit word in register ROUT<0:9>.

3) Output of the recovered clocks RBC0 and RBC1 at one-tenth the serial data rate.

4) Assertion of LUNUSE if received data is either all low or all high.

5) Assertion of COMDET when the "comma" character is detected and available in ROUT<0:9>.

The inputs provided to the Comma Detection and Word Alignment block 208 preferably include:

1) A ten-bit parallel word contained in CHAR<0:9>.

2) The recovered clock (CLOCK) and its complement (CLOCKN) at one-tenth the serial data rate.

3) A reset signal (CLR) that resets all the receiver and status registers.

4) An "enable comma detection" signal (EN_CDET) to enable word synchronization.

Figure 25:
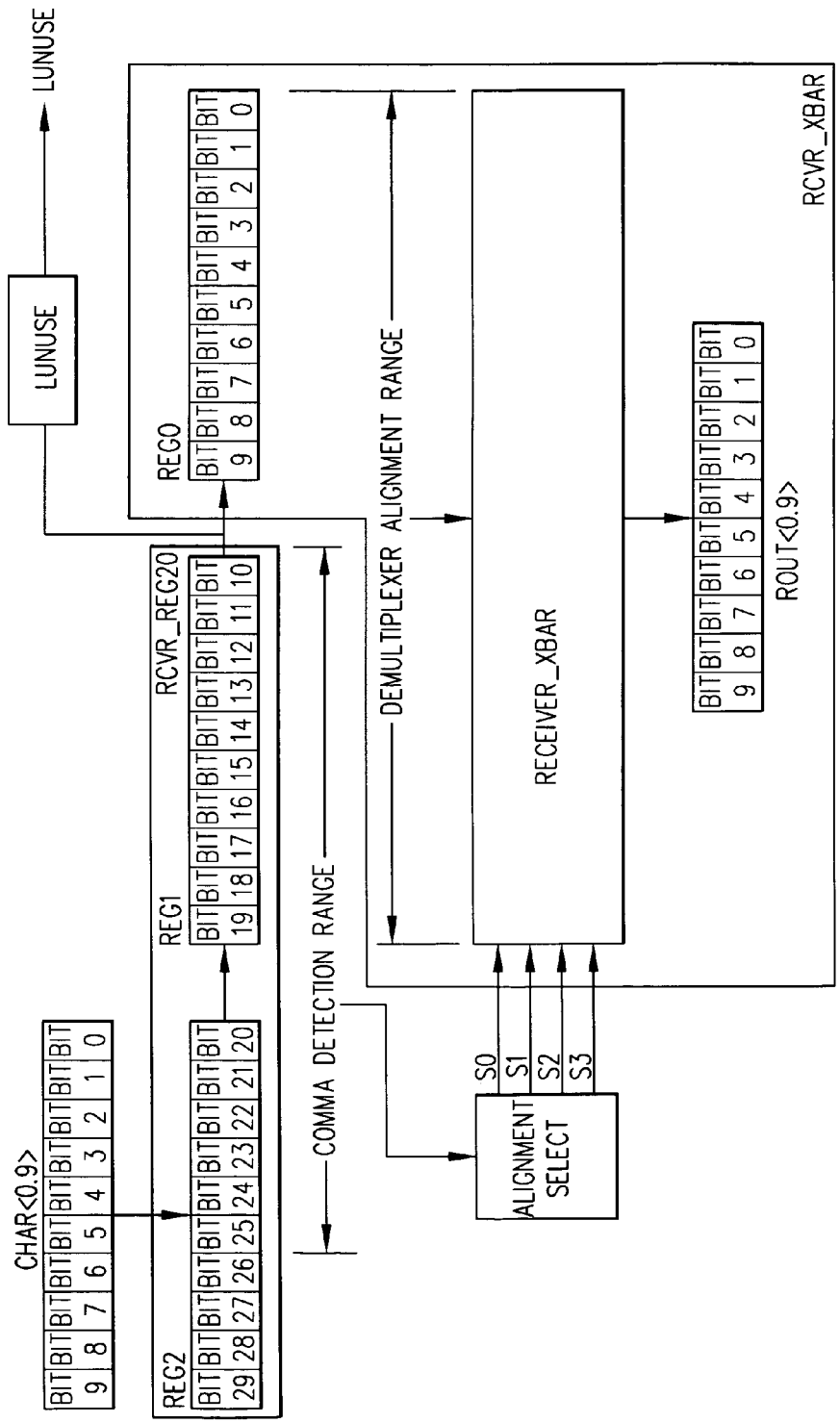
FIG. 25 is a simplified block diagram of a comma detect and word alignment component of the receiver of the present invention.

FIG. 25 shows a block diagram of the Comma Detection and Word Alignment block 208. As shown therein, the RCVR_REG20 and RCVR_XBAR are sub blocks of the Comma Detection and Word Alignment block 208. RCVR_REG20 preferably includes two ten-bit shift registers and RCVR_XBAR includes two ten-bit registers. In operation, individual ten-bit words are clocked and shifted into the receive registers as follows:

| | | |
|---|---|---|
| BIT29 | REG20-CDOUT19 | REG2 |
| BIT28 | REG20-CDOUT18 | |
| BIT27 | REG20-CDOUT17 | |
| BIT26 | REG20-CDOUT16 | |
| BIT25 | REG20-CDOUT15 | |
| BIT24 | REG20-CDOUT14 | |
| BIT23 | REG20-CDOUT13 | |
| BIT22 | REG20-CDOUT12 | |
| BIT21 | REG20-CDOUT11 | |
| BIT20 | REG20-CDOUT10 | |
| BIT19 | REG20-CDOUT9 | REG1 |
| BIT18 | REG20-CDOUT8 | |
| BIT17 | REG20-CDOUT7 | |
| BIT16 | REG20-CDOUT6 | |
| BIT15 | REG20-CDOUT5 | |
| BIT14 | REG20-CDOUT4 | |
| BIT13 | REG20-CDOUT3 | |
| BIT12 | REG20-CDOUT2 | |
| BIT11 | REG20-CDOUT1 | |
| BIT10 | REG20-CDOUT0 | |
| BIT9 | XBAR-CDOUT9 | REG0 |
| BIT8 | XBAR-CDOUT8 | |
| BIT7 | XBAR-CDOUT7 | |
| BIT6 | XBAR-CDOUT6 | |
| BIT5 | XBAR-CDOUT5 | |
| BIT4 | XBAR-CDOUT4 | |
| BIT3 | XBAR-CDOUT3 | |
| BIT2 | XBAR-CDOUT2 | |
| BIT1 | XBAR-CDOUT1 | |
| BIT0 | XBAR-CDOUT0 | |

On each low to high transition of the CLOCK signal, a new ten-bit word CHAR <0:9> is loaded into REG2. The previous contents of REG2 are shifted into REG1, and REG1 is shifted into REG0.

Comma detection is performed by the Comma Detection and Word Alignment block 208 when the EN_CDET signal is high. The register bits BIT10 through BIT25 are constantly monitored for one of two possible FC "comma" patterns, 0011111xxx or 1100000xxx. When a "comma" character pattern is detected, combinatorial logic determines the displacement from BIT10 to the location of the first bit of the "comma" character. Further combinatorial logic sets a four bit binary word comprising S3, S2, S1, and S0. This word determines the binary value for the count of the displacement. Either NCOMMA (0011111xxx) or PCOMMA (1100000xxx) will be asserted depending upon whether a "negative comma" or a "positive comma" was detected.

The following tables depict the possible comma locations:

| Case O: No alignment shift | |
|---|---|
| BIT29 | X |
| BIT28 | X |
| BIT27 | X |
| BIT26 | X |
| BIT25 | X |
| BIT24 | X |
| BIT23 | X |
| BIT22 | X |
| BIT21 | X |
| BIT20 | X |
| BIT19 | X |
| BIT18 | X |
| BIT17 | x |
| BIT16 | 1 |
| BIT15 | 1 |
| BIT14 | 1 |
| BIT13 | 1 |
| BIT12 | 1 |
| BIT11 | 0 |
| BIT10 | 0 |

| Case 1: Alignment shift = 1 | |
|---|---|
| BIT29 | X |
| BIT28 | X |
| BIT27 | X |
| BIT26 | X |
| BIT25 | X |
| BIT24 | X |
| BIT23 | X |
| BIT22 | X |
| BIT21 | X |
| BIT20 | X |
| BIT19 | X |
| BIT18 | X |
| BIT17 | 1 |
| BIT16 | 1 |
| BIT15 | 1 |
| BIT14 | 1 |
| BIT13 | 1 |
| BIT12 | 0 |
| BIT11 | 0 |
| BIT10 | X |

| Case 2: Alignment shift = 2 | |
|---|---|
| BIT29 | X |
| BIT28 | X |
| BIT27 | X |
| BIT26 | X |
| BIT25 | X |
| BIT24 | X |
| BIT23 | X |
| BIT22 | X |
| BIT21 | X |
| BIT20 | X |
| BIT19 | X |
| BIT18 | 1 |
| BIT17 | 1 |
| BIT16 | 1 |
| BIT15 | 1 |
| BIT14 | 1 |
| BIT13 | 0 |
| BIT12 | 0 |
| BIT11 | X |
| BIT10 | X |

| Case 3: Alignment shift = 3 | |
|---|---|
| BIT29 | X |
| BIT28 | X |
| BIT27 | X |
| BIT26 | X |
| BIT25 | X |
| BIT24 | X |
| BIT23 | X |
| BIT22 | X |
| BIT21 | X |
| BIT20 | X |
| BIT19 | 1 |
| BIT18 | 1 |
| BIT17 | 1 |
| BIT16 | 1 |
| BIT15 | 1 |
| BIT14 | 0 |
| BIT13 | 0 |
| BIT12 | X |
| BIT11 | X |
| BIT10 | X |

| Case 4: Alignment shift = 4 | |
|---|---|
| BIT29 | X |
| BIT28 | X |
| BIT27 | X |
| BIT26 | X |
| BIT25 | X |
| BIT24 | X |
| BIT23 | X |
| BIT22 | X |
| BIT21 | X |
| BIT20 | 1 |
| BIT19 | 1 |
| BIT18 | 1 |
| BIT17 | 1 |
| BIT16 | 1 |
| BIT15 | 0 |
| BIT14 | 0 |
| BIT13 | X |
| BIT12 | X |
| BIT11 | X |
| BIT10 | X |

| Case 5: Alignment shift = 5 | |
|---|---|
| BIT29 | X |
| BIT28 | X |
| BIT27 | X |
| BIT26 | X |
| BIT25 | X |
| BIT24 | X |
| BIT23 | X |
| BIT22 | X |
| BIT21 | 1 |
| BIT20 | 1 |
| BIT19 | 1 |
| BIT18 | 1 |
| BIT17 | 1 |
| BIT16 | 0 |
| BIT15 | 0 |
| BIT14 | X |
| BIT13 | X |
| BIT12 | X |
| BIT11 | X |
| BIT10 | X |

| Case 6: Alignment shift = 6 | |
|---|---|
| BIT29 | X |
| BIT28 | X |
| BIT27 | X |
| BIT26 | X |
| BIT25 | X |
| BIT24 | X |
| BIT23 | X |
| BIT22 | 1 |
| BIT21 | 1 |
| BIT20 | 1 |
| BIT19 | 1 |
| BIT18 | 1 |
| BIT17 | 0 |
| BIT16 | 0 |
| BIT15 | X |
| BIT14 | X |
| BIT13 | X |
| BIT12 | X |
| BIT11 | X |
| BIT10 | X |

| Case 7: Alignment shift = 7 | |
|---|---|
| BIT29 | X |
| BIT28 | X |
| BIT27 | X |
| BIT26 | X |
| BIT25 | X |
| BIT24 | X |
| BIT23 | 1 |
| BIT22 | 1 |
| BIT21 | 1 |
| BIT20 | 1 |
| BIT19 | 1 |
| BIT18 | 0 |
| BIT17 | 0 |
| BIT16 | X |
| BIT15 | X |
| BIT14 | X |
| BIT13 | X |
| BIT12 | X |
| BIT11 | X |
| BIT10 | X |

| Case 8: Alignment shift = 8 | |
|---|---|
| BIT29 | X |
| BIT28 | X |
| BIT27 | X |
| BIT26 | X |
| BIT25 | X |
| BIT24 | 1 |
| BIT23 | 1 |
| BIT22 | 1 |
| BIT21 | 1 |
| BIT20 | 1 |
| BIT19 | 0 |
| BIT18 | 0 |
| BIT17 | X |
| BIT16 | X |
| BIT15 | X |
| BIT14 | X |
| BIT13 | X |
| BIT12 | X |
| BIT11 | X |
| BIT10 | X |

| Case 9: Alignment shift = 9 | |
|---|---|
| BIT29 | X |
| BIT28 | X |
| BIT27 | X |
| BIT26 | X |
| BIT25 | 1 |
| BIT24 | 1 |
| BIT23 | 1 |
| BIT22 | 1 |
| BIT21 | 1 |
| BIT20 | 0 |
| BIT19 | 0 |
| BIT18 | X |
| BIT17 | X |
| BIT16 | X |
| BIT15 | X |
| BIT14 | X |
| BIT13 | X |
| BIT12 | X |
| BIT11 | X |
| BIT10 | X |

The Comma Detection and Word Alignment block 208 preferably latches the alignment value on the next positive transition of the CLOCK signal. On the following positive transition of the CLOCK signal, CDET will be made active. The "comma" character will also be latched into ROUT<0:9>. In addition, the correct binary alignment value will be present at the S3, S2, S1 and S0 inputs of MUX<0:9> in the RCVR_XBAR. The 10:1 multiplexer in the RCVR_XBAR block will multiplex one of the ten input bits depending upon the binary values in S3, S2, S1 and S0. The CDET signal will go low on the next low to high transition of the CLOCK signal, provided that the word following the "comma" character does not contain another "comma" character. CDET will also go low when EN_CDET is not enabled.

The following table shows from where the multiplexers will read data for all possible alignment combinations:

| BIT Numbers | | | | | | | | | | |
|---|---|---|---|---|---|---|---|---|---|---|
| 9 | 10 | 11 | 12 | 13 | 14 | 15 | 16 | 17 | 18 | ROUT(9) |
| 8 | 9 | 10 | 11 | 12 | 13 | 14 | 15 | 16 | 17 | ROUT(8) |
| 7 | 8 | 9 | 10 | 11 | 12 | 13 | 14 | 15 | 16 | ROUT(7) |
| 6 | 7 | 8 | 9 | 10 | 11 | 12 | 13 | 14 | 15 | ROUT(6) |
| 5 | 6 | 7 | 8 | 9 | 10 | 11 | 12 | 13 | 14 | ROUT(5) |
| 4 | 5 | 6 | 7 | 8 | 9 | 10 | 11 | 12 | 13 | ROUT(4) |
| 3 | 4 | 5 | 6 | 7 | 8 | 9 | 10 | 11 | 12 | ROUT(3) |
| 2 | 3 | 4 | 5 | 6 | 7 | 8 | 9 | 10 | 11 | ROUT(2) |
| 1 | 2 | 3 | 4 | 5 | 6 | 7 | 8 | 9 | 10 | ROUT(1) |
| 0 | 1 | 2 | 3 | 4 | 5 | 6 | 7 | 8 | 9 | ROUT(0) |
| Alignment Shift 0 | 1 | 2 | 3 | 4 | 5 | 6 | 7 | 8 | 9 | |

The preferably monitors the input data two word periods before the data is output to ROUT<0:9>. If the input data is all high or all low, combinatorial logic sets the "lunuse_det" signal to 1. This signal is then latched and becomes LUNUSE two CLOCK periods later. LUNUSE is delayed two CLOCK periods to allow for the all high or all low data to propagate to ROUT<0:9>.

The Control Logic block 210 provides externally programmable features for the receiver 42. For example, bias control to each individual block allows for incremental programmable power level adjustments. Capacitor values can be adjusted via software to compensate for process variations. Individual blocks can be powered on and off to aid in debugging and testing.

Specifically, the Control Logic block 210 accepts a thirty-two-bit CONFIG_RCVR<0:31> register input and a sixteen-bit CONFIG_RCVR2<0:15> register input. The functions of these register inputs are preferably provided as follows:

CONFIG_RCVR<0:3>—Controls the Voltage bias settings for the 3:1 Analog Input Multiplexer 200.

CONFIG_RCVR<4:7>—Controls the Voltage bias settings for the Filter Circuit.

CONFIG_RCVR<8:11>—Controls the Voltage bias settings for the VCRO 228.

CONFIG_RCVR<12:15>—Controls the Voltage bias settings for the Charge Pump 226.

CONFIG_RCVR<16:19>—Controls the Voltage bias settings for the 3:1 Analog Input Multiplexer 200.

CONFIG_RCVR<20>—Selects the DATA channel from the 3:1 Input Multiplexer 200.

CONFIG_RCVR<21>—Selects the DXBAR channel from the 3:1 Input Multiplexer 200.

CONFIG_RCVR<22>—Selects the DWRAP channel from the 3:1 Input Multiplexer 200.

CONFIG_RCVR<23>—Unused.

CONFIG_RCVR<24:27>—Controls the Voltage bias settings for the DAC in the Frequency Detector block 204.
CONFIG_RCVR<28:31>—Adjusts the internal capacitor Filter settings.
CONFIG_RCVR2<0:3>—Unused.
CONFIG_RCVR2<4:7>—Unused.
CONFIG_RCVR2<8:11>—Unused.
CONFIG_RCVR2<12:15>—Unused.

It should be noted that these configuration registers have internal pull-up/pull-downs to establish a default register setting for nominal operating mode.

Although the present invention has been described in connection with specific operating conditions using particular controls having specific component parts, different or additional components may be provided as needed for different applications. For example, the serializer and deserializer may be modified depending upon the data stream size and speed, as well as the transfer clocking of specific signals. Control of data bits may also be modified depending upon system requirements.

Thus, the present invention provides a GHz Fibre Channel transceiver that can be implemented in lower performance process technologies (i.e., CMOS technology). For example, a Fibre Channel transceiver of the present invention may be provided as a core module for integration into a CMOS Fibre Channel Protocol Controller ASIC. The transmitter 44 of the present invention uses twenty 53 MHz low frequency clocks to obtain the equivalent of a 1 GHz high speed clock. The 3:1 Analog Input Multiplexer of the receiver allows for ease of integration into a Protocol Controller ASIC. Further, the ten stage VCRO of the receiver 42 uses ten 106 MHz low frequency clocks to obtain the equivalent of a 1 GHz high speed clock.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A Fibre Channel transceiver adapted to be implemented in lower performance process technology devices and capable of transmitting and receiving data between electronic devices in a Fibre Channel system, the Fibre Channel Transceiver comprising:

a transmitter having a plurality of clocks and adapted for transmitting data between electronic devices in the Fibre Channel system;

said transmitter further including a serializer for converting a lower speed parallel data stream to a higher speed serial data stream for transmission by the transmitter;

a receiver having a plurality of clocks and adapted for receiving data transmitted between electronic devices in the Fibre Channel system;

said receiver further including a deserializer for converting a receiver higher speed serial data stream from the Fibre Channel system to a lower speed parallel data stream, said deserializer including a voltage controlled oscillator (VCO);

a frequency detector for detecting a frequency of received data, said frequency detector including:
a first counter responsive to a first clock signal from said VCO;
a second counter responsive to a second clock signal;
the first and second counters being driven by the first and second clock signals, respectively, and the first and second counters further being initiated simultaneously and operated simultaneously for a time interval in response to the first and second clock signals;
information from said counters being used to detect a frequency difference between the first and second clock signals, to determine which of said first and second counters is being driven by a higher frequency clock signal, and a degree by which the one of the first and second counters that is driven by a lower frequency one of the clock signals needs to be adjusted, and a magnitude of adjustment needed to be made to said VCO, to enable said first clock signal to be modified so as to be phase locked to an incoming data stream being received by said transceiver;

an output preemphasis circuit for reducing jitter of an output serial data stream; and an output driver for controlling the output power of the transmitter based in part on an output of said output preemphasis circuit.

2. The Fibre Channel transceiver according to claim 1, wherein the lower process technology is CMOS and the Fibre Channel transceiver is adapted for fabrication within a CMOS device.

3. The Fibre Channel transceiver according to claim 1, wherein the transmitter comprises twenty low frequency clocks configured in parallel connection and the receiver comprises ten low frequency clocks configured in parallel connection.

4. The Fibre Channel transceiver according to claim 3, wherein each of the transmitter low frequency clocks is configured at a frequency of about 53 MHz and each of the receiver low frequency clocks is configured at a frequency of about 108 MHz.

5. The Fibre Channel transceiver according to claim 1, wherein the output pre-emphasis circuit comprises a positive emitter coupled logic circuit.

6. The Fibre Channel transceiver according to claim 1, wherein the receiver further comprises input means for receiving data from a plurality of sources.

7. The Fibre Channel transceiver according to claim 6, wherein the input means comprises a multiplexer.

8. The Fibre Channel transceiver according to claim 1, wherein the phase detector comprises a plurality of transistors configured in a totem pole arrangement.

9. The Fibre Channel transceiver according to claim 1, wherein the frequency detector comprises a plurality of digital counters.

10. A Fibre Channel transceiver for communicating between electronic devices in a Fibre Channel system and adapted for implementation in lower performance process technology devices, the Fibre Channel transceiver comprising:

a transmitter having a plurality of parallel phase shifted transmitter clocking means;

a receiver having a plurality of parallel phase shifted receiver clocking means; a serializer for converting a slower parallel stream to a faster Fibre Channel serial data stream for transmission by the transmitter, and controlled in part by the plurality of phase shifted transmitter clocking means;

a deserializer for converting a faster Fibre Channel serial data stream to a slower parallel data stream received by the receiver, and controlled in part by the plurality of phase shifted receiver clocking means;

a phase detector having a plurality of equally phased clocks for detecting the phase of transmitted and received data streams;

a frequency detector having counting means for detecting the frequency of a received data stream;

said deserializer including a voltage controlled oscillator (VCO) for generating a first clock signal;

said frequency detector for detecting a frequency of received data, said frequency detector including:

a first counter responsive to said first clock signal from said VCO;

a second counter responsive to a second clock signal;

the first and second counters being driven by the first and second clock signals, respectively, and the first and second counters being initiated simultaneously and operated simultaneously for a time interval in response to the first and second clock signals;

information from said counters being used to detect a frequency difference between the first and second clock cycles, to determine which of said first and second counters is being driven by a higher frequency clock signal, and a degree by which the one of the first and second counters that is driven by a lower frequency one of the clock signals needs to be adjusted, and a magnitude of adjustment needed to be made to said clock signal from said VCO, to enable said first clock signal to be modified so as to be phase locked to said received data stream; and an output preemphasis circuit for reducing jitter of an output serial data stream; and an output driver for controlling the output power of the transmitter based in part on an output of said output preemphasis circuit.

11. The Fibre Channel transceiver according to claim 10, wherein the lower performance process technology is CMOS and the Fibre Channel transceiver is adapted for use with a CMOS device.

12. The Fibre Channel transceiver according to claim 10, wherein the combined frequency of the plurality of phase shifted transmitter clocking means is equal to about a data transmission rate of the Fibre Channel system.

13. The Fibre Channel transceiver according to claim 10, wherein the combined frequency of the plurality of phase shifted receiver clocking means is equal to about a data transmission rate of the Fibre Channel system.

14. The Fibre Channel transceiver according to claim 10, further comprising a power transmission control means for adjusting a transmission power level of the transmitter.

15. The Fibre Channel transceiver according to claim 14, wherein the power transmission control means includes duplicating means for providing a second data stream for use in determining a proper power level for the transmitter.

16. The Fibre Channel transceiver according to claim 10, wherein the phase detector comprises a comparator for comparing a time interval between each of the equally phased clocks.

17. The Fibre Channel transceiver according to claim 10, further comprising input means for providing multiple channels to thereby receive inputs from a plurality of sources.

18. A method of transmitting and receiving data in a Fibre Channel system using a lower performance process technology, the method comprising the steps of:

converting an incoming received higher-speed Fibre Channel serial data stream to a lower-speed parallel data stream using a receiver, wherein the receiver comprises a deserializer controlled by a plurality of parallel clocking means for converting the higher-speed Fibre Channel serial data stream;

converting an outgoing lower-speed parallel data stream to a higher-speed Fibre Channel serial data stream for transmission by a transmitter, wherein the transmitter comprises a serializer controlled by a plurality of parallel clocking means for converting to the higher-speed Fibre Channel serial data stream;

detecting the frequency of the received higher-speed Fibre Channel serial data stream using a counting means;

detecting the phase of the received higher-speed Fibre Channel serial data and the lower-speed parallel data to be transmitted using a totem pole configured detection means;

wherein detecting the frequency of the received higher speed Fibre Channel serial data stream by using a counting means includes:

using a voltage controlled oscillator (VCO) to generate a first clock signal;

using a frequency detector for detecting a frequency of the received Fibre Channel serial data stream, said frequency detector including:

a first counter responsive to said first clock signal from said VCO;

a second counter responsive to a second clock signal;

driving the first and second counters using the first and second clock signals, respectively, with the first and second counters further being initiated simultaneously and operated simultaneously for a time interval in response to the first and second clock signals;

information from said counters being used to determine which of said first and second counters is being driven by a higher frequency clock signal, and a degree by which the one of the first and second counters that is driven by a lower frequency one of the clock signals needs to be adjusted, and a magnitude of adjustment needed to be made to said clock signal from said VCO to enable said first clock signal to be modified so as to be phase locked to said received data stream;

using an output preemphasis circuit for reducing jitter of an output serial data stream; and using an output driver for controlling the output power of the transmitter based in part on an output of said output preemphasis circuit.

19. The method according to claim 18, further comprising controlling a transmission power of the transmitter based in part on the characteristics of a copy of the transmitted Fibre Channel serial data stream.

* * * * *

UNITED STATES PATENT AND TRADEMARK OFFICE
CERTIFICATE OF CORRECTION

PATENT NO. : 7,602,818 B2
APPLICATION NO. : 09/953057
DATED : October 13, 2009
INVENTOR(S) : Dao et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1622 days.

Signed and Sealed this

Fifth Day of October, 2010

David J. Kappos
*Director of the United States Patent and Trademark Office*